US006253317B1

(12) United States Patent
Knapp, III et al.

(10) Patent No.: US 6,253,317 B1
(45) Date of Patent: Jun. 26, 2001

(54) METHOD AND APPARATUS FOR PROVIDING AND HANDLING TRAPS

(75) Inventors: Henry H. Knapp, III, Castle Rock, CO (US); Joseph R. Eykholt, Los Altos; Roger A. Faulkner, Mountain View, both of CA (US)

(73) Assignee: Sun Microsystems, Inc., Palo Alto, CA (US)

(*) Notice: Subject to any disclaimer, the term of this patent is extended or adjusted under 35 U.S.C. 154(b) by 0 days.

(21) Appl. No.: 08/780,777

(22) Filed: Jan. 9, 1997

(51) Int. Cl.$^7$ ........................................... G06F 9/00
(52) U.S. Cl. .................. 712/244; 712/233; 395/704; 710/260; 710/264
(58) Field of Search ................... 395/701–704, 395/705, 709, 710; 710/260, 264; 712/244, 233

(56) References Cited

U.S. PATENT DOCUMENTS

| | | | |
|---|---|---|---|
| 4,074,353 | * | 2/1978 | Woods et al. ............... 395/737 |
| 4,866,599 | * | 9/1989 | Morganti et al. ............ 395/186 |
| 4,942,524 | * | 7/1990 | Nunomura ................ 395/183.14 |
| 5,093,914 | * | 3/1992 | Coplien et al. . |
| 5,109,504 | * | 4/1992 | Littleton . |
| 5,257,358 | * | 10/1993 | Cohen ..................... 395/183.14 |
| 5,278,985 | * | 1/1994 | Odnert et al. .............. 395/591 |
| 5,359,730 | * | 10/1994 | Marron ..................... 395/712 |
| 5,448,705 | * | 9/1995 | Nguyen et al. . |
| 5,619,698 | * | 4/1997 | Lillich et al. .............. 395/710 |

(List continued on next page.)

OTHER PUBLICATIONS

"Microsoft Press Computer Dictionary—3rd edition" by Microsoft Corp. Redmond, Washington 98052–6399, pp. 262,342, 382, 477, 1997.*

Newcomer, "Debuging real–time system", from Dr. Dobb's Journal, v18, n7, p55(6), ISSN: 1044–789X, Jul. 1993.*

Shandle, "IC aims at digital–audio decompression standards. (Crystal semiconductor Corp.'s CS4920 integrated circuit)" from Electronic Design, v41, n20, p45(4), ISSN: 0013–4872, Oct. 1993.*

(List continued on next page.)

*Primary Examiner*—James P. Trammell
*Assistant Examiner*—Cuong H. Nguyen
(74) *Attorney, Agent, or Firm*—Beyer Weaver & Thomas, LLP

(57) ABSTRACT

A computer program or a computer process is provided by replacing a native computer instruction with a trapping computer instruction which is the size of the native computer instruction and which, when executed, causes a trap to the kernel. A trap handler in the kernel determines that the inserted trapping computer instruction caused the trap and transfers control to a user trap handler. The user trap handler maps the trap site to a patch of computer instructions. When the trapping computer instruction is executed, the trap handler transfers control from the kernel to the user trap handler which in turn transfers control to the patch. Native computer instructions in sufficient proximity to corresponding patches of computer instructions may be replaced with branching computer instructions of the size of the native computer instruction and which transfer control to those corresponding patches. Other native computer instructions are replaced with trapping computer instructions which transfer control to corresponding patches through traps to the kernel. Unanticipated traps may be handled by mapping all trap sites other than those corresponding to inserted trapping computer instructions to a default patch which processes unanticipated traps. Native computer instructions may be replaced with a selected privileged computer instruction. The kernel trap handler transfers control to the user trap handler if a trap is caused by the selected privileged computer instruction and a user trap handler is installed. Information regarding affected components of the state of the computer process prior to the trap is retrieved and stored.

54 Claims, 9 Drawing Sheets

U.S. PATENT DOCUMENTS 5,659,679 * 8/1997 Alpert et al. ....................... 395/183.1
5,692,170 * 11/1997 Isaman ................................. 395/591
5,710,941 * 1/1998 Parry ................................... 395/834

OTHER PUBLICATIONS

Fischer, "Host independent emulator software architecture (in reference to the HP 64700 series emulators)", from Hewlett–Parkard Journal, v39, n6, p52(5); ISSN: 0018–1153, Dec. 1988.*

Lantz, "Using ROM monitors for debugging 32–bit applications", from Computer Design, v31, n3, p104(1); ISSN: 0010–4566, Mar. 1992.*

Goering, "Emulator adds RADE", from Electronic Engineering Times, n.603, p68(2); ISSN: 0192–1541, Aug. 1990.*

* cited by examiner

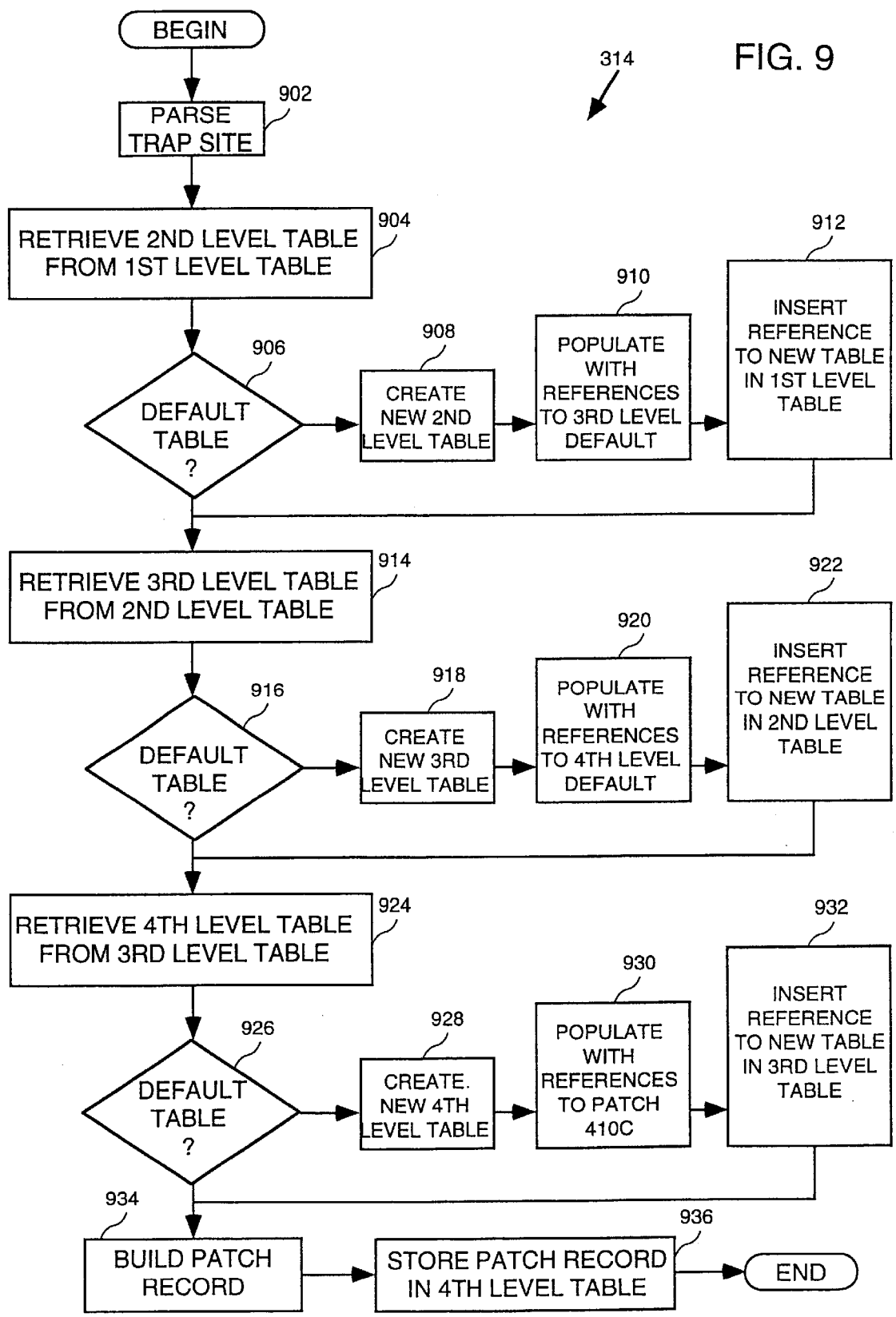

METHOD AND APPARATUS FOR PROVIDING AND HANDLING TRAPS

FIELD OF THE INVENTION

The present invention relates to computer software instrumentation and, in particular, to a system and method in which computer software of any size can be efficiently instrumented while minimizing the reduction in efficiency of the computer software resulting from the instrumentation.

BACKGROUND OF THE INVENTION

Instrumentation of computer software is well-known and involves insertion, into a particular computer program, of computer instructions which evaluate the computer program during execution. As used herein, a computer program is a series of computer instructions and data stored in a computer-readable memory which collectively define a computer process. A computer processor fetches and executes the computer instructions of a computer program to form a computer process. The computer process includes the computer instructions of the computer program and data representing the execution state of the computer process. Execution of an instrumented computer process causes execution of inserted computer instructions to aid in the evaluation of the instrumented computer process. Both computer programs and computer processes can be instrumented.

Instrumentation of a computer program is generally accomplished by one of three techniques. These techniques are also generally applicable to the instrumentation of computer processes. In the first technique, instrumentation computer instructions, are inserted directly into, i.e., between native computer instructions of, the computer program or computer process. As used herein, an instrumentation computer instruction is a computer instruction inserted into a computer program for the purpose of analyzing the computer program, and a native computer instruction is any other computer instruction of a computer program. During development, a computer program typically includes both instrumentation and native computer instructions. However, when the computer program is released as a commercial product, the computer program will typically include only native computer instructions, and all instrumentation computer instructions will typically be removed from the computer program.

As an example of the first technique, instrumentation computer instructions can be inserted before a native computer instruction which accesses computer memory at a particular address. In this example, the instrumentation computer instructions can determine the particular address, compare the particular address to valid memory address ranges, and report an error if the particular address is not within any of the valid memory address ranges.

In a second technique, two or more native computer instructions of a computer program are replaced with a call to a separate instrumentation sequence which is located remotely within the computer program. Calls to sequences are well known and are described herein only briefly for completeness. Calling a sequence transfers control of a computer process to the sequence and provides the sequence with data, e.g., by pushing such data onto a stack. Thus, a call to a sequence involves a change in the state of the computer process (by pushing data on a stack) and a transfer of control. The sequence includes one or more computer instructions which are fetched and executed upon calling of the sequence.

When the computer program attempts to fetch and execute one of the replaced native computer instructions, the instrumentation sequence is called instead. The computer instructions of the instrumentation sequence, which can include for example the replaced native computer instructions and a number of instrumentation computer instructions, are executed. Following execution of a number of the computer instructions of the instrumentation sequence, processing transfers back to the computer program at the computer instruction immediately following the call to the instrumentation sequence. For example, two or more native computer instructions which access computer memory at a particular address can be replaced with a call to a sequence which includes a number of instrumentation computer instructions which determine the particular address, compare the particular address to valid memory address ranges, and report an error if the particular address is not within any of the valid memory address ranges.

In a third technique, a single native computer instruction is replaced with a branch to a sequence of a number of instrumentation computer instructions. The sequence can include, among other computer instructions, the replaced native computer instruction. The last computer instruction of the sequence is typically a branch to the computer instruction of the computer program which is ordinarily executed immediately following execution of the replaced native computer instruction. For example, a native computer instruction which accesses computer memory at a particular address can be replaced with a branch instruction which causes processing to transfer to a sequence of computer instructions including a number of instrumentation computer instructions which determine the particular address, compare the particular address to valid memory address ranges, and report an error if the particular address is not within any of the valid memory address ranges.

It is generally advantageous to add instrumentation computer instructions to, and remove instrumentation computer instructions from, a computer program quickly. It is therefore generally preferred in the art to instrument computer programs in the form of object code rather than source code. Source code is a collection of one or more computer instructions in a form which is intelligible to humans, and object code is a collection of one of more computer instructions in a form which is intelligible to a computer processor. A computer program is generally created by configuration and combination of computer instructions in source code form by a human software engineer who then causes the source code to be compiled, i.e., translated from source code to object code. Compilation of a computer program can be quite time-consuming and can require substantial resources of a computer system. If a computer program is instrumented while in the form of source code, the computer program must be compiled again before the computer program as instrumented can be executed in a computer system. Instrumentation computer instructions can be added to a computer program without requiring recompilation of the computer program if the instrumentation computer instructions are added to the computer program while in the form of object code, i.e., after compilation of the program. In this way, instrumentation computer instructions can be added to or removed from a computer program quickly, i.e., generally in substantially less time than required to compile the computer program.

In addition, computer processes generally include computer instructions in an object code format. Therefore, the ability to instrument object code enables instrumentation of computer processes. As a result, a computer process can be instrumented as needed by a debugger during execution of the computer process. A debugger is a computer process which controls and analyzes the execution of another computer process.

Instrumentation computer instructions are added to a computer program in object code form in generally one of three ways. First, instrumentation computer instructions are inserted in the computer program at the point at which the instrumentation computer instructions are to be executed, thereby displacing native computer instructions at subsequent positions in the computer program. This technique has the advantage of the most efficient execution possible of the computer program as instrumented. However, since native computer instructions are displaced, references to the displaced native computer instructions throughout the computer program must be located and modified to refer to the native computer instructions as displaced. Location and modification of such references takes nearly as much processing as recompiling the computer program from source code and adds the risk that new errors are introduced into the computer program. Thus, this mechanism for adding instrumentation computer instructions to a computer program in object code form provides little advantage, if any, over adding instrumentation computer instructions to a computer program in source code form.

The second mechanism for adding instrumentation computer instructions to a computer program in object code form is replacing a contiguous block of two or more native computer instructions with a call to a sequence of instrumentation computer instructions. A call to a sequence of computer instructions is typically longer than any single computer instruction. Therefore, to avoid displacing a large number of native computer instructions, the size of the block of replaced native computer instructions is at least the size of the call to the sequence of instrumentation computer instructions. If the size of the call is less than the size of the block of replaced native computer instructions, no-op computer instructions, which have no effect when executed, are inserted before or after the call such that the call and the no-op computer instructions collectively occupy the same amount of address space vacated by the block of replaced native computer instructions. A call to a sequence of computer instructions typically includes computer instructions which place data on a stack which is accessible by the called sequence of computer instructions and a computer instruction which transfers processing to the called sequence of computer instructions.

The called sequence of instrumentation computer instructions typically includes the replaced native computer instructions to preserve the overall behavior of the computer program. References throughout the instrumented computer program to some of the replaced native computer instructions must be located and modified to refer to the call to the sequence of instrumentation computer instructions. While this second mechanism for adding instrumentation computer instructions to the computer program displaces fewer native computer instructions than the first-described mechanism, this second mechanism suffers to a substantial degree from the same disadvantages as the first mechanism described above.

The third mechanism for adding instrumentation computer instructions to a computer program in object code form replaces a single native computer instruction with a branch computer instruction which transfers processing to a sequence of instrumentation computer instructions, which can include the replaced native computer instruction. Since only a single native computer instruction is displaced, any transfer of control to the displaced native computer instruction transfers control to the branch computer instruction which in turn transfers control to the sequence of instrumentation computer instructions, which include the displaced native computer instruction. Therefore, the overall behavior of the computer program is unchanged as a result of the instrumentation. "Transfer of control" is used herein as the term is generally used in the art to refer to the sequence of execution of computer instructions. In other words, if control is transferred from a first computer instruction to a second computer instruction, the second computer instruction is executed immediately following the first computer instruction.

The last instrumentation computer instruction of the sequence is generally a branch computer instruction which transfers control to the native computer instruction whose execution immediately follows execution of the replaced native computer instruction in the computer program without instrumentation computer instructions. The size of the branch computer instruction is typically the same size as the replaced native computer instruction to avoid displacing other native computer instructions. If the size of the branch computer instruction is less than size of the replaced native computer instruction, one or more no-op computer instructions are inserted before or after the branch computer instruction such that the branch computer instruction and the no-op computer instructions collectively occupy the same amount of address space vacated by the replaced native computer instruction.

The sequence of instrumentation computer instructions can be inserted into the computer program at generally any location so long as the sequence of execution of native computer instructions is not changed. If the sequence of instrumentation computer instructions is inserted at a location such that native computer instructions are displaced, this third mechanism for adding instrumentation computer instructions to a computer program suffers from the same disadvantage as the first two mechanisms described above, namely, that references to the displaced native computer instructions must be located and modified. It is therefore generally preferred in the art that such a sequence of instrumentation computer instructions be added to the end of the computer program so that no native computer instructions are displaced. Such is frequently not feasible, however, when the original location of the replaced native computer instruction is too far from the sequence of instrumentation computer instructions to be reached by a branch instruction of the size of the replaced native computer instruction. The following example is illustrative.

Some native computer instructions, e.g., the PUSH computer instruction, are as small as one byte. Such a native computer instruction must generally be replaced with a branching computer instruction whose length is at most one byte. Such a branching computer instruction can typically transfer control to a computer instruction which is displaced from the branching computer instruction by at most 255 bytes. Therefore, a native computer instruction whose length is only one byte can only be efficiently instrumented according to the third technique described above if the native computer instruction is no more than 255 bytes from the last address of the computer program occupied by a native computer instruction. Many computer programs in use today are several orders of magnitude greater than 255 bytes. Thus, many native computer instructions of such computer programs cannot be instrumented by any of the techniques described above without displacing a significant number of other native computer instructions.

Therefore, no satisfactory mechanism currently exists for adding instrumentation computer instructions to particular large computer programs. Current solutions either (i) require excessive time and resources to add instrumentation computer instructions to, or remove instrumentation computer instructions from, computer programs or (ii) cannot efficiently instrument certain native computer instructions of a computer program.

SUMMARY OF THE INVENTION

In accordance with the present invention, a single native computer instruction is replaced with a user-programmable trap to the kernel of an operating system and execution of the trap transfers control to a sequence of instrumentation computer instructions. A trap to the kernel can transfer control from any computer instruction of a computer program to any other computer instruction of the computer program without regard to the size of the computer program or the distance between the two computer instructions in the memory address space of the computer program. In addition, a single native computer instruction can be replaced with a user-programmable trap such that no other native computer instructions are displaced by such a replacement.

In some computer instruction sets, computer instructions can have a length of a single byte, which is typically too short to provide the functionality of a user-programmable trap to the kernel. However, in accordance with the present invention, the trap handler for processing system traps to the kernel by execution of a privileged computer instruction, e.g., the HALT computer instruction, which is a single byte in length, is replaced with a novel system trap handler. The novel system trap handler first determines whether a trap is of the type known as a General Privilege Fault by quick examination of the contents of the process stack. If the trap is a General Privilege Fault, the novel trap handler then compares the computer instruction generating the trap with the particular privileged computer instruction. If the particular privileged computer instruction generates the trap, the novel trap handler determines whether a user-defined trap handler for the particular privileged computer instruction has been installed. If so, the user-defined, installed privileged computer instruction trap handler is executed. Conversely, if no such user-defined handler is installed, the novel system trap handler processes the HALT computer instruction in a conventional manner. Thus, a native computer instruction whose length is a single byte can be replaced with a user-programmable trap to the kernel in accordance with the present invention.

Conventional traps to the kernel are inefficient and require such additional processing as to slow the computer program thus instrumented beyond acceptable levels. However, in accordance with the present invention, several mechanisms are employed to ensure that such traps are handled with substantially improved efficiency. First, a novel trap handler transfers processing from the kernel to a computer process's address space as quickly as possible while preserving as much of the state of the computer process as possible. In other words, in processing a quick trap to the kernel, the novel trap handler does substantially no more than (i) retrieve data representing zero or more components of the state of the computer process which are changed by the trap to the kernel, (ii) store the data in a memory location accessible by the computer process, and (iii) transfer control to the computer process. In one embodiment, the trap handler places a single piece of information, i.e., the program counter, onto the stack of the computer process and transfers processing to a trap handling procedure in the computer process's address space. In another embodiment, no change is made to the computer process's state and the trap handler transfers processing to a trap handling procedure in the computer process's address space. In such an embodiment, the address at which the trap originated is derived from other information or each trap is handled in the same manner regardless of the address at which the trap originated. The trap handling procedure in the computer process's address space determines which instrumentation computer instructions to execute according to the address at which the trap originated, which is specified by the program counter of the computer process at the time of the trap, which is either passed by the system trap handler or is derived by the trap handling procedure from other information. For example, some processors store the address at which a trap originates in special, well-known registers which can be read by the computer process to determine that address.

Second, the trap handling procedure in the address space of the computer process more quickly determines whether a trap invoked by the computer process is anticipated and corresponds to an installed patch. A patch, as used herein, is a collection of instrumentation computer instructions which replace a one or more native computer instructions. A patch can include the replaced native computer instruction. The address of the instrumentation computer instruction which is executed first when the patch is executed is the entry point of the patch. The trap handling procedure includes a table in which patch entry points are associated with corresponding trap sites. As used herein, a trap site is the address within the computer process of the trapping computer instruction, i.e., the computer instruction which replaces the replaced native computer instruction and which causes a trap when executed.

The absence of a patch for an unanticipated trap is not detected but is instead avoided. In particular, the table is populated such that any trap site, whether anticipated or otherwise, is properly mapped to a patch. A patch for unanticipated traps is provided within the computer process and unanticipated traps cause this patch to be executed. This patch generally informs the user that an unanticipated error has occurred and that the computer process will terminate. By directing unanticipated traps in this manner, testing that a patch is installed for a particular trap is obviated. Accordingly, anticipated traps, i.e., traps intentionally placed into the computer program, are processed more quickly.

Third, traps are used to instrument a computer program only in situations in which replacing a single native computer instruction with a branch to a patch is unacceptable, e.g., because the distance between the replaced native computer instruction and the patch exceeds the reachable range of a branch instruction equal in length to the replaced native computer instruction. Thus, in accordance with an aspect of the present invention, the novel instrumentation mechanisms of the present invention are combined with conventional instrumentation mechanisms to provide an even more efficiently instrumented computer program.

BRIEF DESCRIPTION OF THE DRAWINGS

FIG. 9 is a logic flow diagram of the inclusion within the patch database of FIG. 7 of a patch entry point and the association within the database of FIG. 7 of a trap site with the newly included patch entry point.

DETAILED DESCRIPTION

In accordance with the present invention, a computer process is instrumented by replacing individual native computer instructions of the computer process with traps to the kernel of the operating system in which the computer process executes. The kernel, in processing such a trap during execution of the process, transfers processing back to the computer process, more specifically, to a trap handling procedure within the computer process. Before describing the instrumentation of a computer process in accordance with the present invention in further detail, a computer system, within which computer processes execute and within which a computer process is instrumented in accordance with the represent invention, and constituent components thereof are described briefly.

Figure 1:
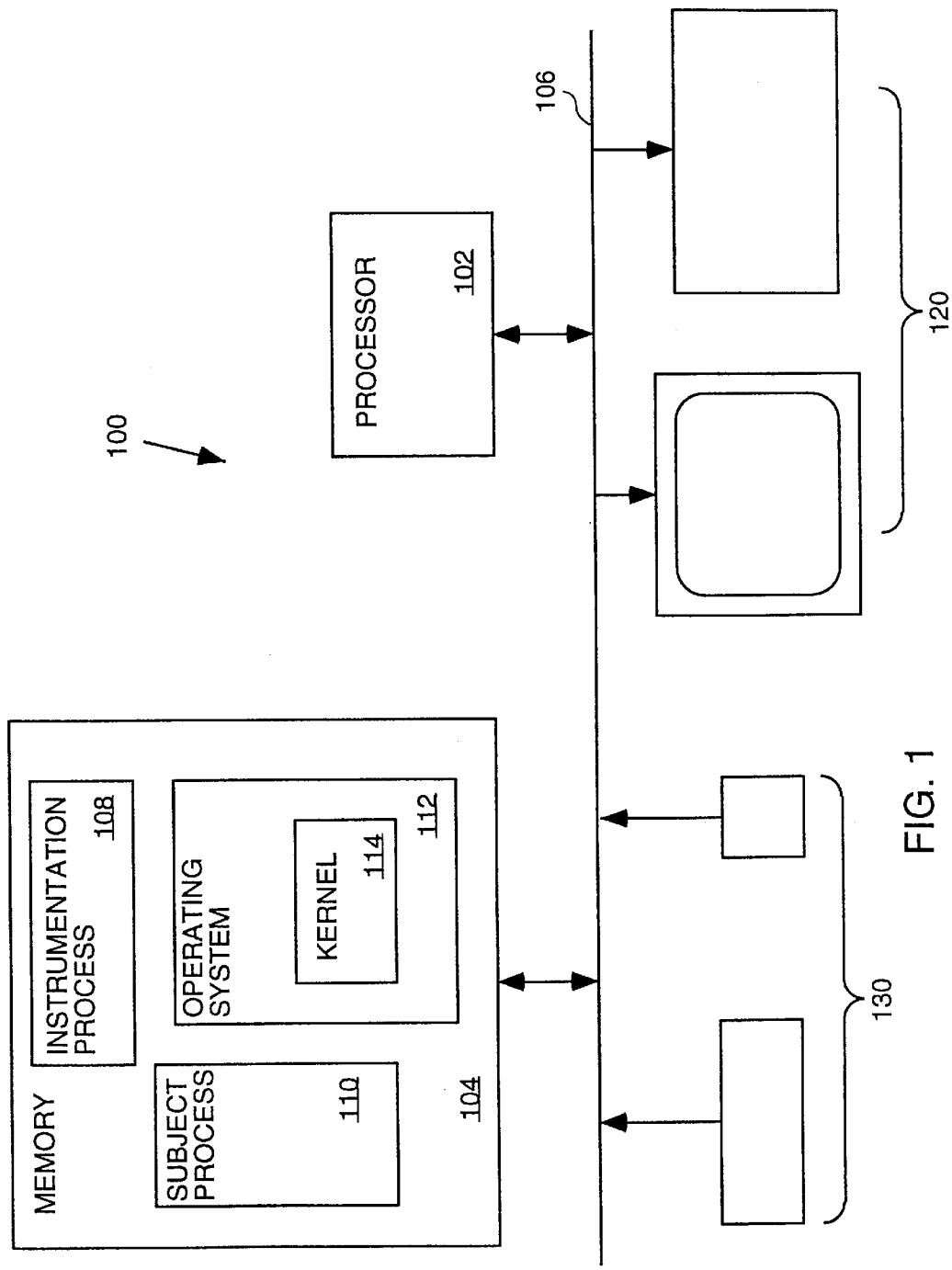
FIG. 1 is a block diagram of a computer system in accordance with the present invention.

Most computer systems in use today are generally of the structure shown in FIG. 1. Computer system 100 includes a processor 102 which fetches computer instructions from a memory 104 through a bus 106 and executes those computer instructions. In executing computer instructions fetched from memory 104, processor 102 can retrieve data from or write data to memory 104, display information on one or more computer display devices 120, receive command signals from one or more user-input devices 130, or transfer data to other computer systems which collectively form a computer network (not shown). Processor 102 can be, for example, any of the SPARC processors available from Sun Microsystems, Inc. of Mountain View, Calif., any of the PowerPC processors available from Motorola Corporation of Schaumburg, Ill., or any of the X86 series of processors available from Intel Corporation of Santa Clara, Calif. or any processors compatible therewith. Memory 104 can include any type of computer memory including, without limitation, randomly accessible memory (RAM), read-only memory (ROM), and storage devices which include magnetic and optical storage media such as magnetic or optical disks. Computer display devices 120 can include, for example, printers and computer display screens such as cathode-ray tubes (CRTs), light-emitting diode (LED) displays, and liquid crystal displays (LCDs). User-input devices 130 can include without limitation electronic keyboards and pointing devices such as electronic mice, trackballs, lightpens, thumbwheels, digitizing tablets, and touch sensitive pads.

Computer system 100 can be, e.g., any of the SPARCstation workstation computer systems available from Sun Microsystems, Inc. of Mountain View, Calif., any of the Macintosh computer systems based on the PowerPC processor and available from Apple Computers, Inc. of Cupertino, Calif., or any computer system compatible with the IBM PC computer systems available from International Business Machines, Corp. of Somers, N.Y., which are based on the X86 series of processors available from Intel Corporation or compatible processors. Sun, Sun Microsystems, and the Sun Logo are trademarks or registered trademarks of Sun Microsystems, Inc. in the United States and other countries. All SPARC trademarks are used under license and are trademarks of SPARC International, Inc. in the United States and other countries. Products bearing SPARC trademarks are based upon an architecture developed by Sun Microsystems, Inc.

Executing within processor 102 from memory 104 is a novel instrumentation process 108. Instrumentation process 108 is a computer process which facilitates analysis of another computer process, e.g., subject process 110, by adding instrumentation computer instructions to, or removing instrumentation computer instructions from, the other computer process. By selectively adding instrumentation computer instructions to subject process 110, instrumentation process 108 alters the behavior of subject process 110 in such a way that facilitates analysis of subject process 110. The instrumentation of subject process 110 by instrumentation process 108 is described more completely below. While it is described herein that instrumentation process 108 instruments subject process 110, which is a computer process, it is appreciated that the techniques described below are also applicable to instrumentation of computer programs, including computer programs in the form of object code.

Also executing within processor 102 from memory 104 is an operating system 112 which includes a kernel 114. Operating system 112 is generally a set of computer programs which enable computer system 100 to understand and process commands, control input and output of computer system 100 through user-input devices 130 and computer display devices 120, schedule computer processes for execution, manage data stored in various storage devices of memory 104 of computer system 100, and control the operation of peripheral devices (not shown) coupled to computer system 100. Kernel 114 of operating system 112 is that portion of operating system 112 which manages the interface between computer processes (e.g., instrumentation process 108 and subject process 110) and user-input devices 130 and computer display devices 120, manages memory 104, schedules computer processes for execution, and maintains a file system which in turn manages storage of data on various storage devices of memory 104. In some embodiments, kernel 114 is the only part of operating system 112 which interacts with the hardware components of computer system 100. All interaction with hardware components of computer system 100 is through kernel 114.

Figure 2:
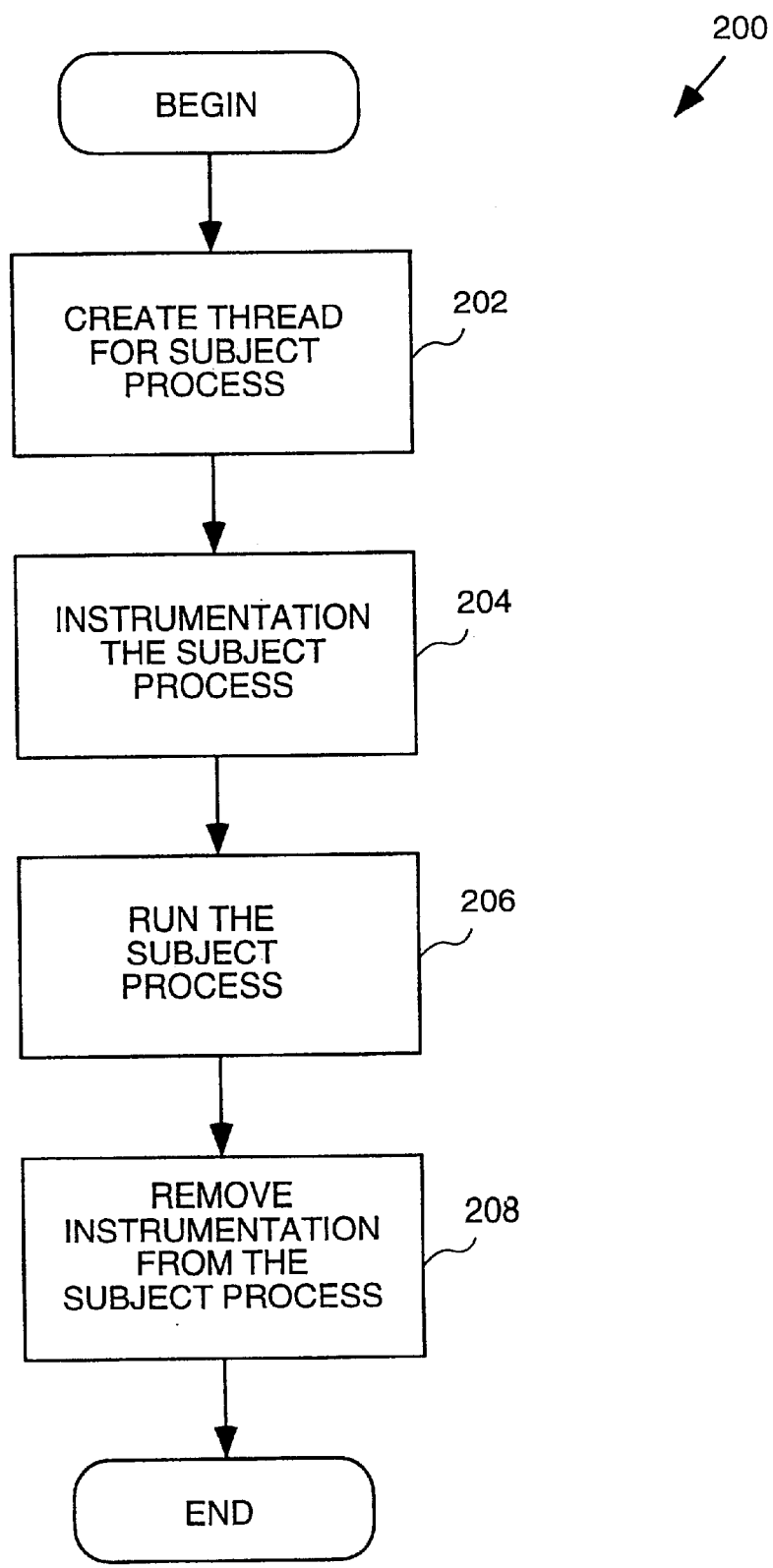
FIG. 2 is a logic flow diagram of the instrumentation of a computer process and execution of the computer process as instrumented in accordance with the present invention.

Instrumentation process 108 facilitates analysis of subject process 110 according to logic flow diagram 200 (FIG. 2). In step 202, instrumentation process 108 creates a thread within which subject process 110 executes. Threads, computer processes, and computer programs are related to one another as follows.

A computer program is a series of computer instructions and data which, when executed within a computer system, perform a task. Execution of a computer program is a computer process, and the computer program defines the computer process. A single computer program can be executed any number of times, and each execution is a different computer process. Most computer systems in use today permit several computer processes to execute concurrently within a computer system. In addition to the computer instructions and data of a defining computer program, a computer process includes information identifying the computer instruction which is currently being executed, the computer instruction which is to be executed next, and the current state of the computer process, including a stack which is used to save previous computer process states for later restoration.

In some operating systems, a computer process can create new execution states which are sometimes called "threads," which are independent of the execution state of the computer process, and which execute concurrently with one another and with the computer process within the computer system. Each thread which executes concurrently is independently scheduled for execution by kernel 114 (FIG. 1). Such a computer process having multiple threads is generally called a "multi-threaded" computer process and each thread is sometimes referred to as a "light-weight process." Each thread of a computer process executes in the context of the computer process. In particular, each thread shares the address space of the computer process and resources are allocated to a computer process, and therefore all threads of the computer process, rather than an individual thread. In creating a thread within which subject process 110 executes, instrumentation process 108 maintains access to the components of subject process 110, including native computer instructions and the address space of subject process 110.

From step 202 (FIG. 2), processing transfers to step 204 in which instrumentation process 108 (FIG. 1) instruments subject process 110 by replacing individual native computer instructions of subject process 110 with respective patches, each of which includes one or more instrumentation computer instructions and can include the corresponding replaced native computer instruction. The replacement of individual native computer instructions with respective patches is described below more completely.

Processing transfers from step 204 (FIG. 2) to step 206 in which instrumentation process 108 (FIG. 1) causes subject process 110, as instrumented, to execute. Execution of subject process 110 includes execution of each patch in place of the corresponding replaced individual native computer instruction in a manner described below more completely. The instrumentation computer instructions of each patch can perform any of a number of tasks including, without limitation, checking that an access to memory 104 is to a portion of memory 104 allocated to subject process 110, reporting to a user or recording for later analysis a component of the state of subject process 110, suspending execution of subject process 110 so that a user of instrumentation process 108 can issue commands which query various components of the state of subject process 110, and counting the number of times various native computer instructions of subject process 110 are executed.

Following step 206 (FIG. 2), processing transfers to step 208 in which each patch inserted in step 204 is replaced with the original corresponding native computer instruction replaced by the patch in step 204 and instrumentation is thereby removed from subject process 110 (FIG. 1). After step 208 (FIG. 2), processing according to logic flow diagram 200 terminates. Thus, instrumentation process 108 (FIG. 1) instruments subject process 110, which prior to such instrumentation is uninstrumented, executes subject process 110 as instrumented to analyze the behavior of subject process 110, and removes instrumentation computer instructions from subject process 110 to return subject process 110 to its previous, uninstrumented state.

Figure 3:
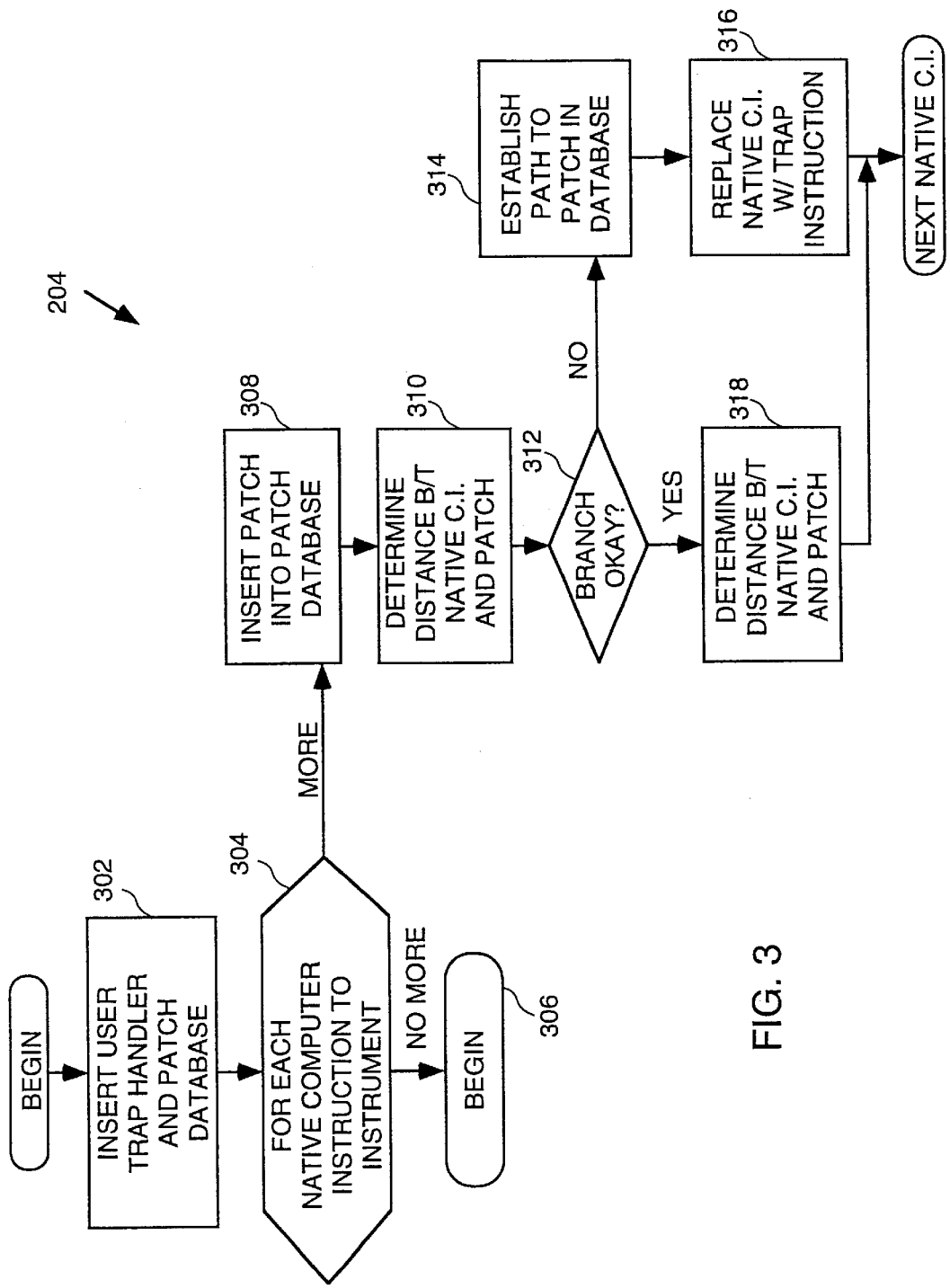
FIG. 3 is a logic flow diagram of the instrumentation of a computer process in accordance with the present invention.
Figures 4A, 4B:
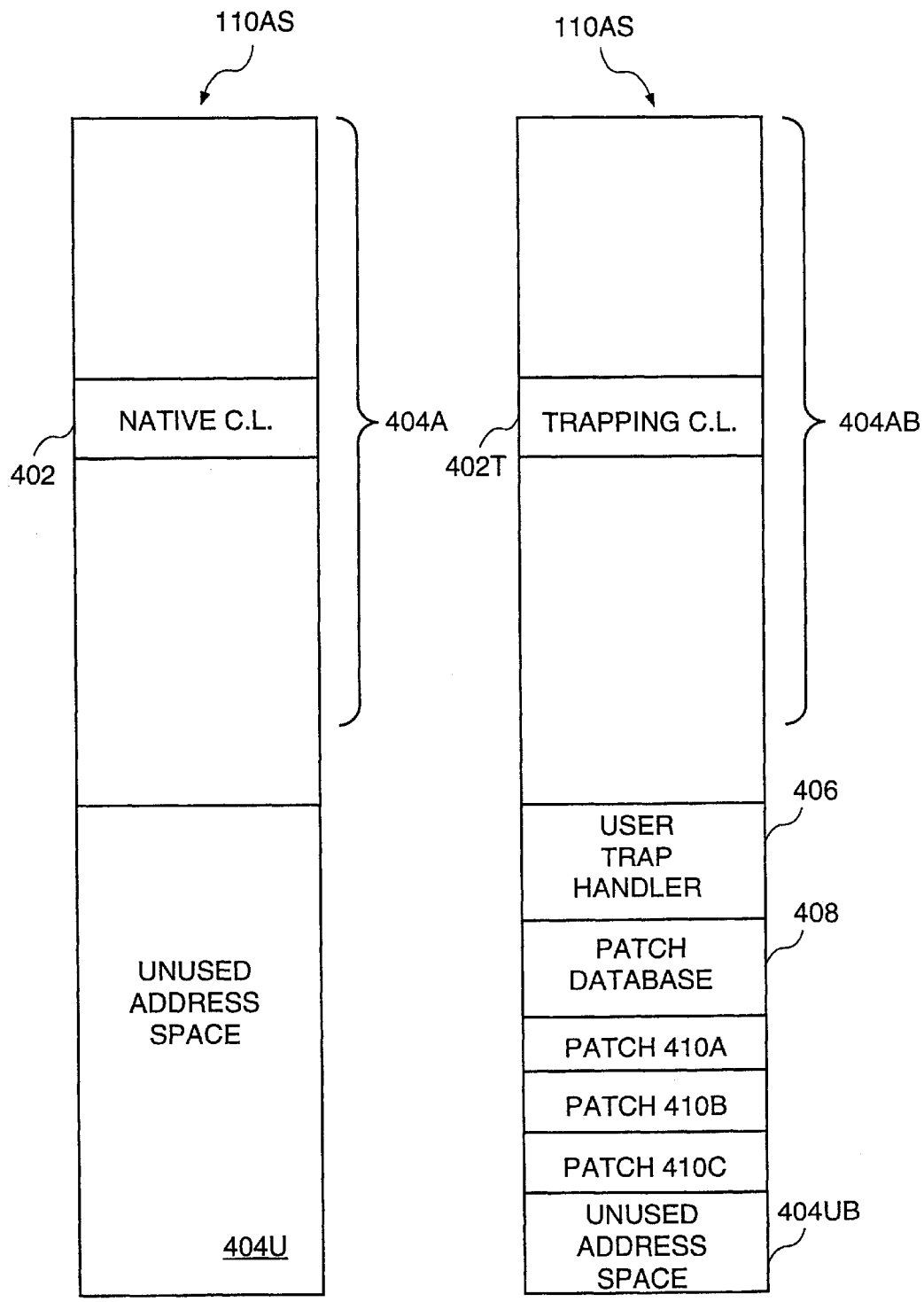
FIGS. 4A and 4B are block diagrams of the address space of a computer process prior to and following, respectively, instrumentation of the computer process in accordance with the present invention.

As described briefly above, instrumentation process 108 instruments subject process 110 in step 204 (FIG. 2) by replacing individual native computer instructions of subject process 110 (FIG. 1) with respective patches of instrumentation computer instructions. Step 204 (FIG. 2) is shown in greater detail as logic flow diagram 204 (FIG. 3). Prior to step 204, subject process 110 (FIG. 1) has an address space 110AS generally as shown in FIG. 4A. Address space 110AS is that portion of memory 104 (FIG. 1) which is addressable by subject process 110. Address space 110AS (FIG. 4) includes allocated memory 404A, which is allocated to and used by subject process 110, and unused memory 404U, which is not allocated to and not used by subject process 110. Processing according to logic flow diagram 204 (FIG. 3) begins with step 302 in which instrumentation process 108 (FIG. 1) includes in unused memory 404U (FIG. 4A) a user trap handler 406 (FIG. 4B), which is a trap handling procedure, and a patch database 408. User trap handler 406 and patch database 408 associate replaced native computer instructions of subject process 110 with respective corresponding patches and are described in greater detail below.

From step 302 (FIG. 3), processing transfers to loop step 304 which, in conjunction with next step 320, defines a loop in which each of a number of native computer instructions of subject process 110 (FIG. 1) is replaced with a respective patch. For each such native computer instruction, processing transfers from loop step 304 (FIG. 3) to step 308. Once each of the native computer instructions has been processed according to the loop defined by loop step 304 and next step 320, processing transfers from loop step 304 to terminal step 306 in which processing according to logic flow diagram 204 terminates. During each iteration of the loop defined by loop step 304 and next step 320, the native computer instruction processed is called the subject native computer instruction.

In step 308, instrumentation process 108 (FIG. 1) inserts into patch database 408 (FIG. 4B) a patch, e.g., patch 410A, which replaces the subject native computer instruction, e.g., native computer instruction 402 (FIG. 4A). Processing transfers from step 308 (FIG. 3) to step 310 in which instrumentation process 108 (FIG. 1) determines the distance between the subject native computer instruction and the corresponding patch within address space 110AS (FIG. 4B). For example, instrumentation process 108 (FIG. 1) determines the distance between the address of native computer instruction 402 (FIG. 4A) and the address of the first computer instruction, i.e., the entry point, of corresponding patch 410A (FIG. 4B). From step 310 (FIG. 3), processing transfers to test step 312 in which instrumentation process 108 (FIG. 1) compares the distance between the subject native computer instruction and the entry point of the corresponding patch to the maximum reachable distance of a branch computer instruction having a size which is equal to or less than the size of the subject native computer instruction.

If the distance between the native computer instruction and the corresponding patch is less than or equal to the maximum reachable distance of a branch computer instruction having a size which is less than or equal to the size of the subject native computer instruction, processing transfers to step 318 in which instrumentation process 108 (FIG. 1) replaces the subject native computer instruction with a branch computer instruction which, when executed, transfers control of subject process 110 to the corresponding patch, e.g., patch 410A (FIG. 4B). Thus, if the subject native computer instruction can be replaced with a branch computer instruction which transfers control of subject process 110 to the corresponding patch in a conventional manner, the branch computer instruction is used since transferring control by use of a branch computer instruction is typically more efficient than transferring control through traps to kernel 114 (FIG. 1). However, if the distance between the native computer instruction and the corresponding patch is greater than the maximum reachable distance of a branch computer instruction which is no larger than the size of the subject native computer instruction, processing transfers from test step 312 (FIG. 3) to step 314.

In step 314, instrumentation process 108 (FIG. 1) stores in patch database 408 (FIG. 4B) information regarding the location within address space 110AS of the entry point of the patch corresponding to native computer instruction 402, e.g., patch 410A. Patch database 408 includes a data structure by which patch 410A can be quickly and efficiently located during execution of subject process 110. The particular structure of patch database 408 and the storage of information which is used to locate a particular patch are described more completely below. From step 314 (FIG. 3), processing transfers to step 316 in which instrumentation process 108 (FIG. 1) replaces the subject native computer instruction, e.g., native computer instruction 402 (FIG. 4A), with a trapping computer instruction, e.g., trapping computer instruction 402T (FIG. 4B), of the same or smaller size. If trapping computer instruction 402T is smaller than native computer instruction 402 (FIG. 4A), no-op computer instructions, which have no effect when executed, are inserted with trapping computer instruction 402T (FIG. 4B) to such that the no-op computer instructions and trapping computer instruction 402T are collectively equal in size to native computer instruction 402 (FIG. 4A). Therefore, all other native computer instructions of subject process 110 are not displaced within address space 110AS and therefore execute properly without modification. Execution of trapping instruction 402T invokes a trap to kernel 114 (FIG. 1) and ultimately causes execution of patch 410A (FIG. 4B) in place of corresponding native computer instruction 402 (FIG. 4A) in a manner described more completely below.

Thus, when the distance between the subject native computer instruction and the corresponding patch is too great to be reached by a branch computer instruction no larger than the size of the subject native computer instruction, the subject native computer instruction is replaced with a trapping instruction execution of which causes a trap to kernel 114 which in turn transfers processing to the corresponding patch as described more completely below. In an alternative embodiment, processing transfers from step 308 (FIG. 3) directly to step 314 and all subject native computer instructions are replaced with trapping computer instructions which ultimately transfer control the corresponding respective patches.

Processing transfers from either step 318 or step 316 through next step 320 to loop step 304 in which the next subject native computer instruction is processed according to the loop defined by loop step 304 and next step 320. As described above, once each of the native computer instructions to be instrumented have been processed according to the loop of loop step 304 and next step 320, processing according to logic flow diagram 204, and therefore step 204 (FIG. 2), terminates.

As described above, instrumentation process 108 (FIG. 1) executes subject process 110 as instrumented in step 206 (FIG. 2). During execution of subject process 110, trapping computer instruction 402T (FIGS. 4B and 5) is executed when native computer instruction 402 (FIG. 4A) would have otherwise been executed. Upon execution of trapping computer instruction 402T (FIG. 5), processing transfers to a kernel trap handler 502 of kernel 114. The transfer of control to a trap handler of a kernel of an operating system is well known and conventional and is not described in detail herein. Briefly, certain circumstances, including execution of certain computer instructions, cause execution of a computer process, e.g., subject process 110, to be interrupted and cause a trap handling procedure, e.g., kernel trap handler 502, in kernel 114 to execute instead.

Circumstances which cause such a trap typically include a computer process entering an invalid state from which recovery is unlikely or interruption of a computer process resulting from activity in a peripheral device associated with the computer process. In either case, quick and efficient transfer of processing into and out of the kernel is not a concern. In the former case, something has gone terribly wrong with the computer process and the kernel's task is not to restore the computer process to a valid state but instead to report to a user sufficient information regarding the state of the computer process for diagnostic purposes. In short, the computer process is no longer a going concern and interest in the computer process is generally in determining precisely what happened to the computer process. In the latter case, processing of the computer process is suspended pending completion of an activity concerning a peripheral device. Activity involving a peripheral device generally requires large amounts of time relative to the time and processing required to transfer control to and from kernel 114 and saving and restoring the entire state of the computer process during such transfers of control. Therefore, efficient transfer of control into and out of kernel 114 is generally unimportant in the latter case. As a result, conventional kernel trap handlers are typically not sufficiently efficient to transfer control from trapping computer instruction 402T (FIG. 5) to corresponding patch 410A in an instrumented computer process without slowing execution of subject process 110 so instrumented beyond acceptable limits.

Figure 5:
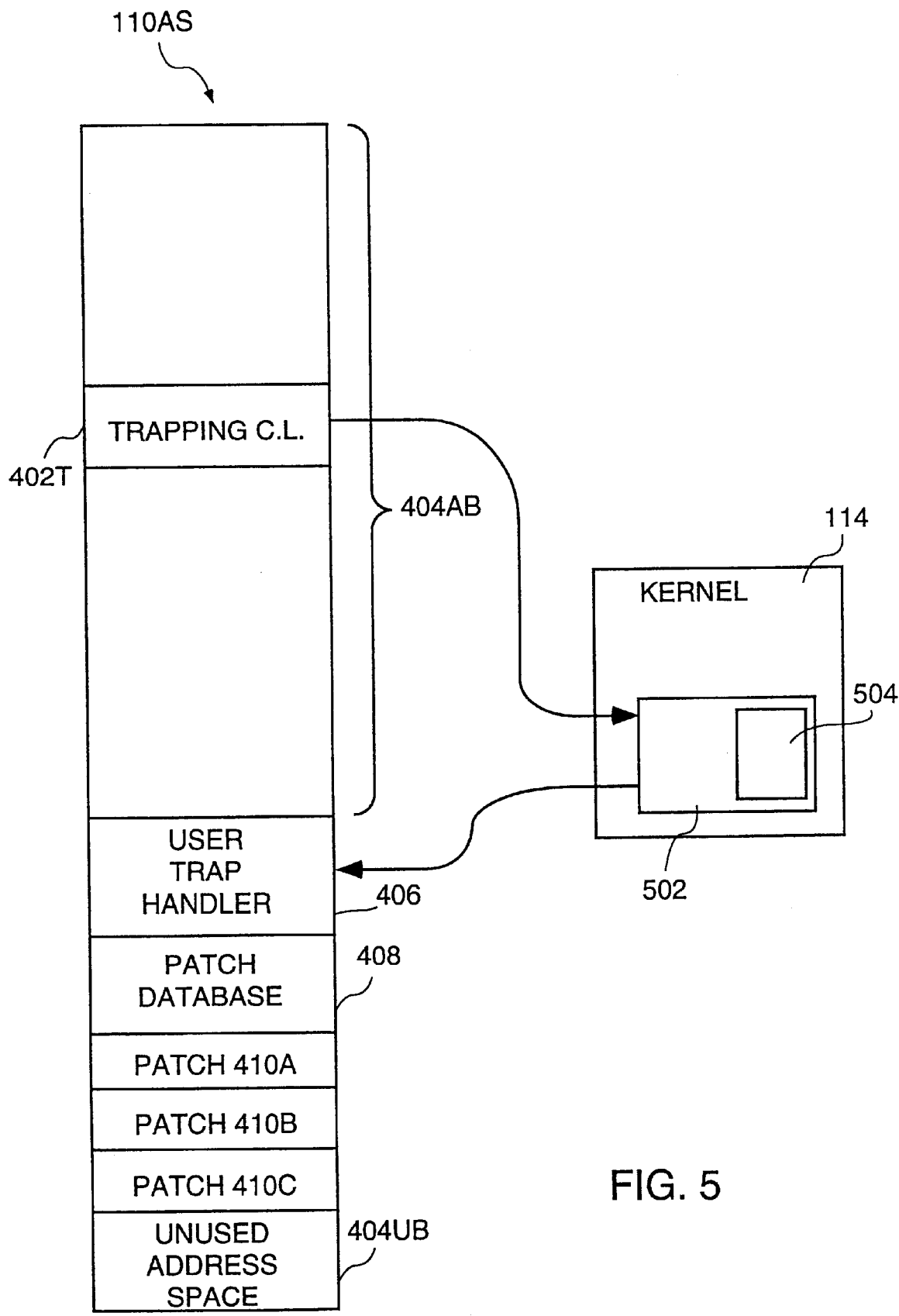
FIG. 5 is a block diagram illustrating the transfer of control to a patch of instrumentation computer instructions through the kernel in accordance with the present invention.
Figure 6:
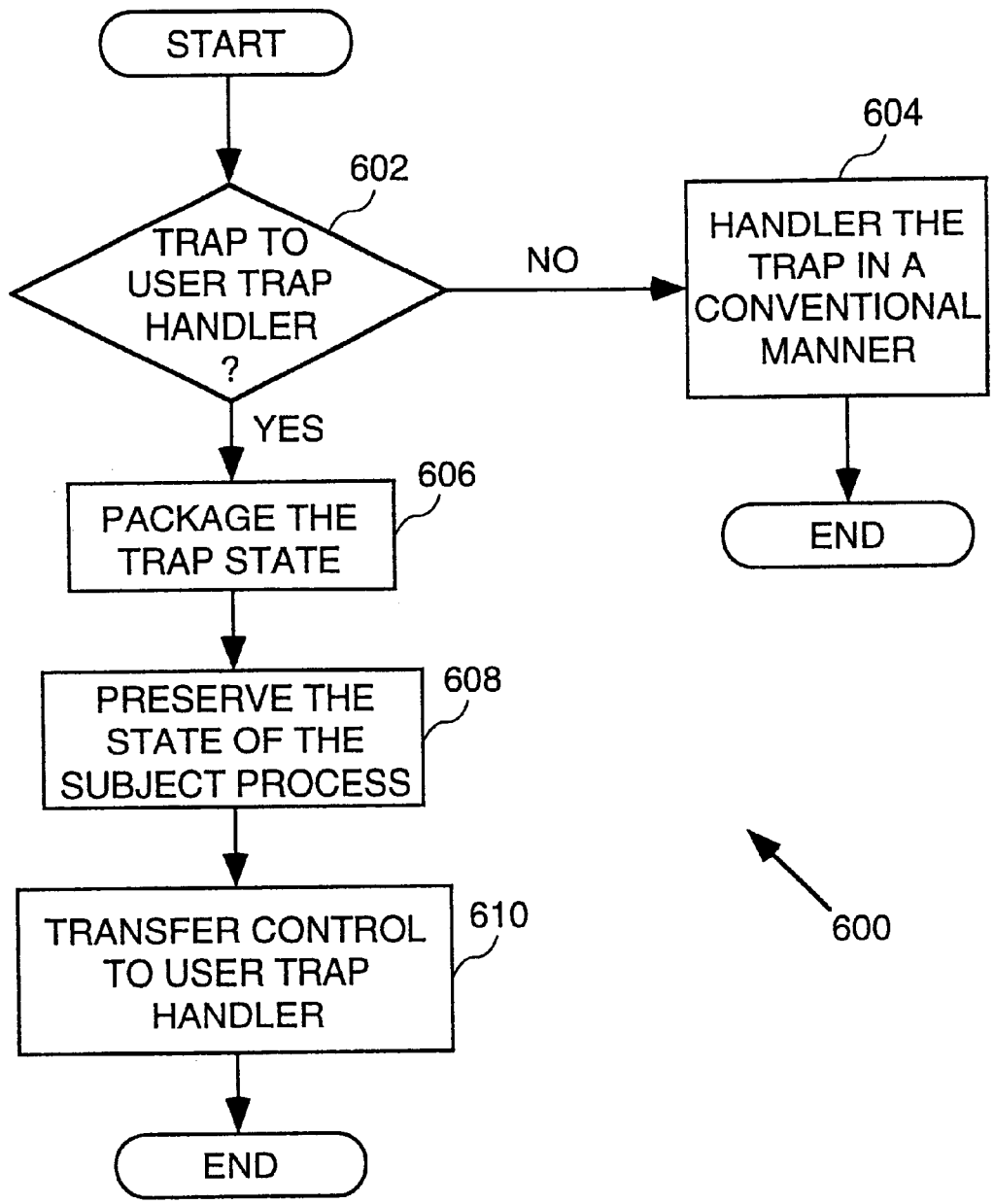
FIG. 6 is a logic flow diagram of the handling of a trap to the kernel by a kernel trap handler in accordance with the present invention.

Kernel trap handler 502 (FIG. 5) of kernel 114 is a novel and particularly efficient trap handler. Kernel trap handler 502 processes traps generated by execution of computer instructions of subject process 110 (FIG. 1) according to logic flow diagram 600 (FIG. 6). Processing begins in step 602 in which kernel trap handler 502 (FIG. 5) determines whether the trap is one for which a user-defined trap handling procedure is installed. A user-defined trap handling procedure is a collection of computer instructions and data structures which are defined externally with respect to operating system 112 (FIG. 1) and which are to be executed in the event of a trap caused by a particular type of trapping computer instruction. Kernel trap handler 502 includes a data structure 504 which is a part of the representation within kernel 502 of the execution state of subject process 110 from the perspective of kernel 502. Data structure 504 associates an entry point of a user-defined trap handling procedure with each interrupt address used by a trapping computer instruction which can be used to invoke a user-defined trap handling procedure. For each interrupt address for which no user-defined trap handling procedure is installed, the associated entry point is NULL, i.e., is not a valid address, to so indicate. In general, a respective interrupt address corresponds to each type of trapping computer instruction, i.e., each type of computer instruction which is capable of causing a trap. Alternatively, data structure 504 associates an entry point of a user-defined trap handling procedure with each type of trapping computer instruction. If no such user-defined trap handling procedure is defined for a particular type of trapping computer instruction, no entry point is associated with that type of trapping computer instruction within data structure 504. Associating an entry point of a particular user-defined trap handling procedure with a particular type of trapping computer instruction is sometimes referred to as "installing" the user-defined trap handling procedure for the particular type of trapping computer instruction. In one embodiment, kernel 502 includes a single user-defined trap handling procedure entry point which is NULL if no user-defined trap handling routine is installed.

If no user-defined trap handling procedure is installed for the interrupt address corresponding to the type of computer instruction which generated the trap, processing transfers to step 604 (FIG. 6) in which the trap is handled in a conventional manner and after which processing according to logic flow diagram 600 terminates. Conversely, if a user-defined trap handling procedure is defined for the type of computer instruction which generated the trap, e.g., trapping computer instruction 402T (FIG. 5), processing transfers to step 606 (FIG. 6).

In step 606, kernel trap handler 502 (FIG. 5) packages the state of the trap for communication to user trap handler 406, which is installed for the type of trapping computer instruction 402T, of subject process 110 (FIG. 1). The packaged trap state includes substantially no more than is necessary for the execution state of computer process 110 to be restored to the state of computer process 110 prior to the trap to kernel 114 and for computer process 110 to determine to which computer instruction to next execute. For example, if a number of components of the execution state of subject process 110 are changed as a result of the trap to kernel 114, data representing the state of those components prior to the trap are retrieved and included in the packaged state. The packaged state also generally includes the trap site which is the address of the computer instruction generating the trap, e.g., the address within address space 110AS (FIG. 5) at which trapping computer instruction 402T is located. The packaged trap state also includes, in one embodiment, the address of the computer instruction, execution of which immediately follows the replaced native computer instruction and, therefore, follows execution of the corresponding replacing patch. For example, some processors, such as the SPARC processor, pipeline computer instructions such that the computer instruction which is at a memory address immediately following a branch computer instruction is executed prior to the target computer instruction of the branch computer instruction. In such a situation, the computer instruction which executes immediately following execution of the instrumentation computer instructions of patch 410A is not the computer instruction at the address within address space 110AS which immediately follows the address of trapping computer instruction 402T, but is instead the target of the branching computer instruction which immediately precedes trapping computer instruction 402T in address space 110AS. In addition, kernel trap handler 502 avoids taking any action which would further alter the execution state of subject process 110, for example, by opening a new registers window so that subsequent processing by kernel trap handler 502 does not affect the state of the registers as of the trap to kernel 114. In addition, kernel trap handler 502 avoids further affecting the execution state of subject process 110 by doing substantially as little as possible to provide sufficient information to subject process 110 to restore its prior execution state and, in some embodiments, to identify the trap site and, in some embodiments, to identify the computer instruction whose execution immediately follows execution of the patch corresponding to the trap site.

In conventional kernel trap handlers, the entire state of computer process 110 and of processor 102 is typically captured and stored prior to transferring processing to any user-defined trap handler. The reason for capturing the processing state is that traps to the kernel typically indicate that time is not of the essence, as described briefly above, either due to some catastrophic occurrence or as a result of interruption of the computer process by a time-consuming event, e.g., input signals from a user input device. Capturing the entire processing state generally requires one hundred to one thousand times more processing time than the time required to capture only substantially the minimum information required (i) to determine the site of the trap, (ii) to determine which computer instruction is to be executed after handling the trap, and (iii) to restore the state of the computer process in all other respects to its state prior to the trap. Therefore, conventional kernel trap handling procedures are insufficiently efficient to transfer processing from trapping computer instructions to corresponding patches of instrumentation computer instructions quickly enough to execute a computer process so instrumented with acceptable speed.

From step 606 (FIG. 6), processing transfers to step 608 in which kernel trap handler 502 (FIG. 5) preserves the state of subject process 110. In invoking a trap which is processed by kernel trap handler 502, the state of subject process 110 is generally changed. In step 608 (FIG. 6), the state of subject process 110 (FIG. 5) is restored such that patch 410A is executed as if the instrumentation computer instructions of patch 410A were inserted into address space 110AS in place of native computer instruction 402. Kernel trap handler 502 preserves the state of subject process 110 by creating a new context within which to work, thereby preserving the context of subject process 110, or by simply not changing components of the execution state of subject process 110, for example. A context generally includes one or more registers and/or flags which represent components of the execution state of a computer process. Specific examples of the restoration of the state of subject process 110 are described below in conjunction with specific examples of the processing of kernel trap handler 502.

From step 608 (FIG. 6), processing transfers to step 610 in which kernel trap handler 502 (FIG. 5) terminates and transfers processing control to user trap handler 408 while communicating to user trap handler 408 the trap state packaged in step 606 (FIG. 6). In one embodiment, the packaged trap state is communicated to user trap handler 406 (FIG. 5) by storing the package trap state in memory 104 at a location accessible to user trap handler 406, e.g., the stack of subject process 110.

User trap handler 406 retrieves and unpacks the packaged trap state information and transfers processing control to a patch, i.e., one of patches 410A–C, in accordance with the trap state information. Specifically, user trap handler 406 retrieves from the packaged trap state information the trap site, i.e., the address within address space 110AS of trapping computer instruction 402T which is the computer instruction generating the current trap. User trap handler 406 then retrieves from patch database 408 a patch entry point of the patch corresponding to the retrieved trap site. For example, if the trap site is the address of trapping computer instruction 402T, the corresponding patch is patch 410A.

User trap handler 406 transfers control to the patch entry point and the computer instructions of the patch are executed. After execution of the instrumentation computer instructions of patch 410A, control transfers to the computer instruction of computer process 110 which would ordinarily execute immediately following execution of the replaced native computer instruction. Since the length of patch 410A is not limited to a specific length, branching computer instructions of particularly long lengths can be included in patch 410A to reach any address within address space 110AS to thereby return processing to native computer instructions of computer process 110. Thus, in accordance with the present invention, native computer instruction 402 is replaced with trapping computer instruction 402T, execution of which transfers processing control through kernel trap handler 502 to user trap handler 406 to patch 410A of instrumentation computer instructions which are thereby executed in place of native computer instruction 402.

The Patch Database

Figure 7:
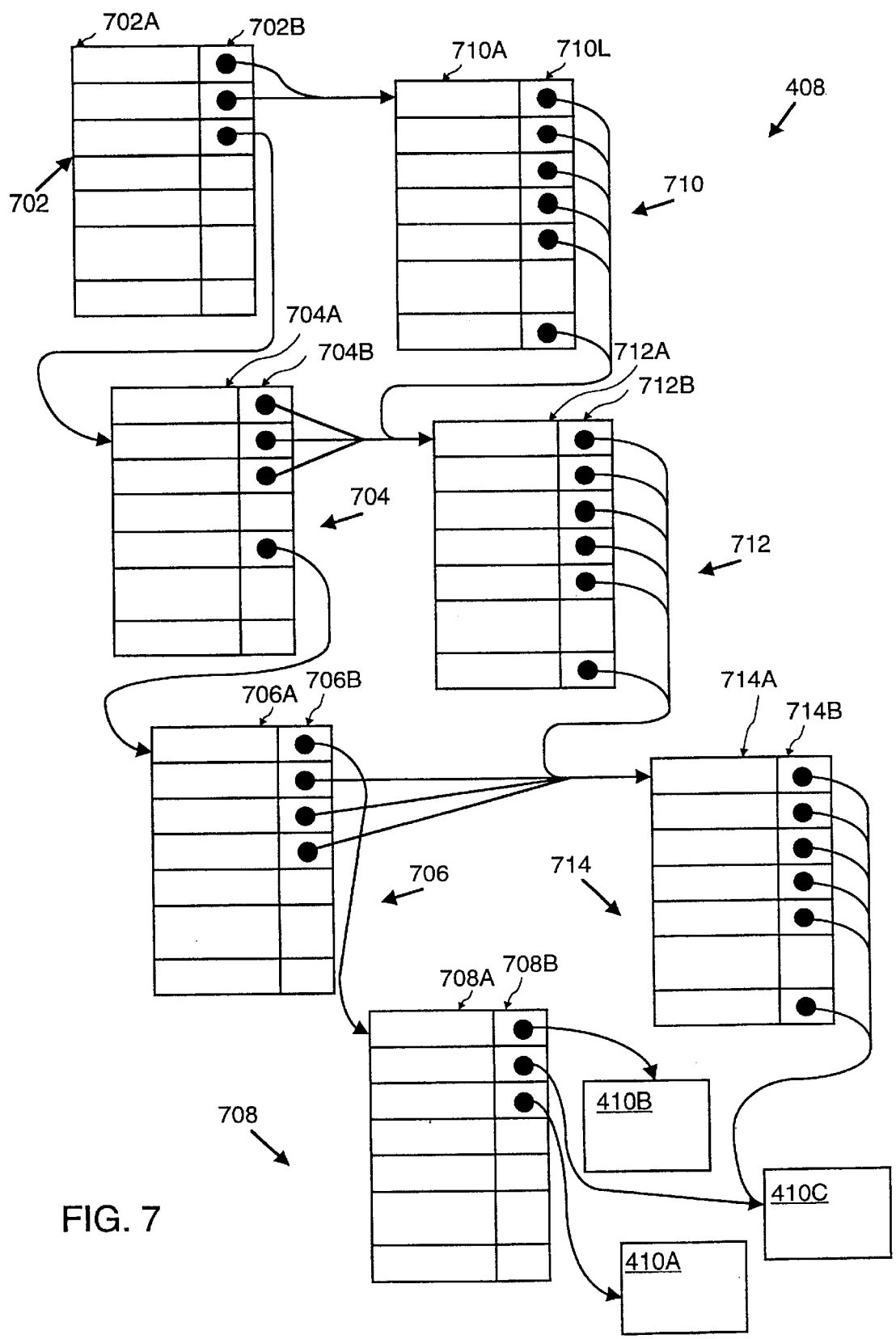
FIG. 7 is a block diagram of a patch database in accordance with the present invention.
Figure 8:
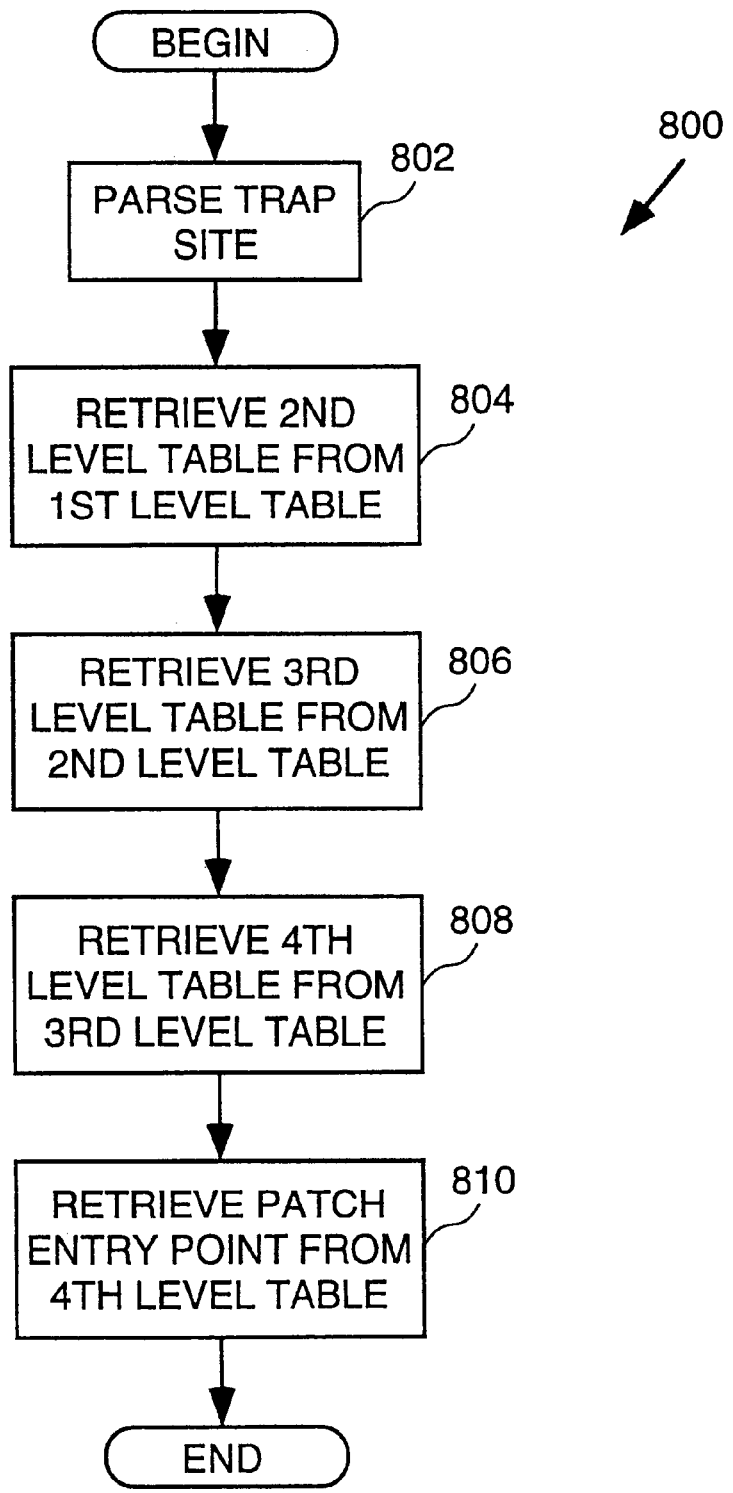
FIG. 8 is a logic flow diagram of the retrieval from the patch database of FIG. 7 of a patch entry point corresponding to a particular trap site in accordance with the present invention.

Patch database 408 is shown in greater detail in FIG. 7. The structure of patch database 408 is described in the context of logic flow diagram 800 (FIG. 8), according to which user trap handler 406 retrieves from patch database 408 a patch entry point corresponding to a particular trap site. The trap site is parsed into four (4) indices: a first level index, a second level index, a third level index, and a fourth level index. Patch database 408 generally includes four levels of tables and each index of the trap site corresponds to a respective table level. In one embodiment, a trap site is a 32-bit address and each index parsed from the trap site is a byte of the trap site, the first level index being the most significant byte and the fourth level index being the least significant byte. It is appreciated that more or fewer than four (4) levels can be used without departing from the principles of the present invention. Processing transfers from step 802 (FIG. 8) to step 804 in which user trap handler 406 (FIG. 5) retrieves from a first level table 702 (FIG. 7) a reference to a second level table corresponding to the first level index of the trap site, e.g., second level table 704. First level table 702 includes index values 702A and second level table references 702B and associates with each possible value of the first level index of the trap site a reference to a second level table. In one embodiment, second level table references 702B are pointers to second level tables, e.g., second level table 704.

Processing transfers from step 804 (FIG. 8) to step 806 in which user trap handler 406 (FIG. 5) retrieves from second level table 704 (FIG. 7) a reference to a third level table corresponding to the second level index of the trap site, e.g., third level table 706. Second level table 704 includes second level index values 704A and third level table references 704B and associates with each possible value of the second level index of the trap site a reference to a third level table. Processing transfers from step 806 (FIG. 8) to step 808 in which user trap handler 406 (FIG. 5) retrieves from third level table 706 (FIG. 7) a reference to a fourth level table 708 corresponding to the third level index of the trap site in a manner which is directly analogous to that described above with respect to tables 702 and 704. Fourth level table 708 is, in one embodiment, an indexed array which associates various fourth level indices 708A with patch entry points 708B. Associated with the fourth level index of the trap site of trapping computer instruction 402T (FIG. 5) within fourth level table 708 (FIG. 7) a patch entry point corresponding to patch 410A. From step 808 (FIG. 8), processing transfers to step 810 in which user trap handler 406 (FIG. 5) retrieves from fourth level table 708 (FIG. 7) the patch entry point of patch 410A using the fourth level index of the trap site.

Retrieving patch entry points from patch database is particularly efficient, even when large numbers of trap site/patch entry point associations are stored in patch database 408. First, by dividing patch database 408 into multiple levels, a few memory accesses (steps 804–808—FIG. 8) by user trap handler 406 (FIG. 5) can be used to retrieve, from a rather large database, a relatively small data structure, e.g., fourth level table 708 (FIG. 7), in which a particular patch entry point can be quickly and efficiently located. In one embodiment, the fourth level index of a trap site is the eight least significant bits of the trap site and therefore has one of 256 values. Therefore, fourth level table 708 can have at most 256 associations between fourth level indices and respective patch entry points. Fourth level table 708 can have generally any structure which can be searched quickly and efficiently. In one embodiment, fourth level table 708 is an indexed array in which fourth level indices 708A are used to index corresponding associated patch entry points.

Second, processing according to logic flow diagram 800 (FIG. 8) is particularly efficient since logic flow diagram 800 includes no logic for determining that no patch entry point corresponding to the trap is included in patch database 408 (FIG. 7). It is possible that an unanticipated error in subject process 110 (FIG. 5) causes a trap to kernel 114 which in turn causes kernel trap handler 502 to transfer processing control to user trap handler 406 when patch database 408 contains no patch entry point associated with the trap site of the unanticipated error. However, applying logic to check for such a contingency slows each and every access of patch database 408 and slows further subject process 110 which is already slowed to transfer processing control from trapping computer instruction 402T to patch 410A. When a large number of patches are added to subject process 110, e.g., several thousand patches, further slowing of each and every access of patch database 408 can easily reduce processing speed of subject process 110 as instrumented below tolerable limits.

To avoid such slowing, a default patch 410C is included in patch database 408. When user trap handler 406 accesses patch database 408 according to logic flow diagram 800 (FIG. 8), all trap sites which are not anticipated are automatically associated with default patch 410C (FIG. 5). Execution of default patch 410C takes appropriate action, e.g., notifies the user of an unanticipated error and terminates execution of subject process 110. Fourth level table 708 (FIG. 7) of patch database 408 includes an association between each and every unused fourth level index corresponding to fourth level table 708 and a patch entry point corresponding to default patch 410C. An unused fourth level index corresponding to fourth level table 708 is a fourth level index which, in conjunction with (i) the third level index specifying fourth level table 708, (ii) the second level index specifying third level table 706, and (iii) the first level index specifying second level table 704, does not specify a trap site created by instrumentation process 108 (FIG. 1) in the manner described above. Therefore, any trap site which has the first, second, and third level indices of the trap site described above with respect to FIG. 8 and which has a fourth level index which does not correspond to a patch added to subject process 110 (FIG. 1) by instrumentation process 108 in the manner described above is directed to default patch 410C (FIG. 7) without specifically testing for the contingency that the trap site is unanticipated.

In addition, patch database 408 includes a fourth level table 714 in which every possible fourth level index 714A is associated with a patch entry point 714B corresponding to default patch 410C. Each and every third level index in third level table 706 for which no patch is included in patch database 408 is associated within third level table 706 with a pointer to fourth level table 714. Thus, if user trap handler 406 retrieves third level table 706 in step 806 (FIG. 8) and no patch is installed for any trap site having a third level index of the current trap site, fourth level table 714 (FIG. 7) is retrieved in step 808 (FIG. 8) and control within subject computer process 110 (FIG. 5) is ultimately transferred to default patch 410C.

Patch database 408 (FIG. 7) also includes a third level table 712 and a second level table 710. Every possible third level index in third level table 712 is associated with a reference 712B to fourth level table 714, and every possible second level index in second level table 710 is associated with a reference 710B to third level table 712. Every second level index in second level table 704 for which no patch is included in patch database 408 is associated with a reference to third level table 712, and every first level index in first level table 702 for which no patch is included in patch database 408 is associated with a reference to second level table 710. If no patch corresponding to the first level index of a trap site is included in patch database 408, user trap handler 406 (FIG. 5) retrieves second level table 710 (FIG. 7) in step 804 (FIG. 8) and default patch 410C (FIG. 7) is ultimately executed. Similarly, if no patch corresponding to the second level index of a trap site is included in patch database 408, user trap handler 406 (FIG. 5) retrieves third level table 712 (FIG. 7) in step 806 (FIG. 8) and default patch 410C (FIG. 7) is ultimately executed. Thus, if a trap site is unanticipated and no patch corresponding to the trap site is included in patch database 408, a patch entry point of default patch 410C is retrieved according to logic flow diagram 800 (FIG. 8) without specifically testing for such a condition.

Patches are stored in patch database 408 (FIG. 7) as follows. As described above with respect to FIG. 3, instrumentation process 108 (FIG. 1) stores in patch database 408 (FIG. 5) information regarding the location within address space 110AS of a patch corresponding to a particular native computer instruction in step 314 (FIG. 3). Step 314 is shown in greater detail as logic flow diagram 314 in FIG. 9. Initially, prior to inclusion in patch database 408 (FIG. 7) of any patches, patch database 408 includes only first level table 702, second level table 710, third level table 712, fourth level table 714, and default patch 410C, and every first level index 702A of first level table 702 is associated with a pointer to second level table 710. Therefore, before any patch is added to patch database 408, all trap sites correspond to default patch 410C. In addition, every address of address space 110AS (FIG. 5) is associated within patch database 408 with default patch 410C in a relatively small data structure which can be efficiently traversed. Logic flow diagram 314 (FIG. 9) is described below in the illustrative context of adding patch 410A (FIG. 7) to patch database 408 such that execution of trapping computer instruction 402T (FIG. 5) causes execution of patch 410A (FIG. 7). According to logic flow diagram 314 (FIG. 9), processing begins with step 902.

In step 902, instrumentation process 108 (FIG. 1) parses the new trap site, i.e., the address within address space 110AS (FIG. 4A) of native computer instruction 402. Parsing the new trap site produces a first level index, a second level index, a third level index, and a fourth level index. Processing transfers from step 902 (FIG. 9) to step 904 at which instrumentation process 108 (FIG. 1) retrieves from first level table 702 (FIG. 7) a pointer to a second level table according to the first level index of the new trap site in a manner that is directly analogous to that described above with respect to step 804 (FIG. 8). From step 904 (FIG. 9), processing transfers to test step 906 in which instrumentation process 108 (FIG. 1) determines whether the retrieved pointer identifies second level table 710 (FIG. 7), thereby indicating that patch database 408 includes no patches corresponding to the first level index of the new trap site. If the retrieved pointer does not identify second level table 710, processing transfers to step 914 (FIG. 9) which is described below. Conversely, if the retrieved pointer identifies second level table 710 (FIG. 7), processing transfers to step 908 (FIG. 9).

In step 908, instrumentation process 108 (FIG. 1) creates a new second level table, e.g., second level table 704 (FIG. 7). Processing transfers to step 910 (FIG. 9) in which instrumentation process 108 (FIG. 1) sets all third level table references of the new second level table, e.g., third level table references 704B (FIG. 7) of second level table 704, to refer to third level table 712. Since second level table 704 is newly created in this example, second level table 704 does not correspond to any patches in patch database 408 and therefore refers user trap handler 406 (FIG. 5) to default patch 410C (FIG. 7). Second level table 704 is later updated, as described below, to lead user trap handler 406 (FIG. 5) to newly installed patch 410A, which is installed in step 308 (FIG. 3) as described above. From step 910 (FIG. 9), processing transfers to step 912 in which instrumentation process 108 (FIG. 1) associates, with the first level index of the new trap site, a reference to the newly created second level table 704 (FIG. 7) within first level table 702. Processing transfer from 912 (FIG. 9) to step 914.

In step 914, instrumentation process 108 (FIG. 1) retrieves from second level table 704 (FIG. 7), which is either retrieved in step 904 (FIG. 9) or created in step 908, a reference to a third level table according to the second level index of the new trap site. Step 914 is directly analogous to step 806 (FIG. 8) described above. From step 914 (FIG. 9), processing transfers to test step 916 in which instrumentation process 108 (FIG. 1) determines whether the retrieved reference identifies third level table 712 (FIG. 7), thereby indicating that patch database 408 includes no patches corresponding to the second level index of the new trap site. If the retrieved reference does not identify third level table 712, processing transfers to step 924 (FIG. 9) which is described below. Conversely, if the retrieved reference identifies third level table 712 (FIG. 7), processing transfers to step 918 (FIG. 9).

In step 918, instrumentation process 108 (FIG. 1) creates a new third level table, e.g., third level table 706 (FIG. 7). Processing transfers to step 920 (FIG. 9) in which instrumentation process 108 (FIG. 1) sets all fourth level table reference of the new third level table, e.g., fourth level table references 706B (FIG. 7) of third level table 706, to refer to fourth level table 714. Since third level table 706 is newly created in this example, third level table 706 does not correspond to any patches in patch database 408 and therefore ultimately refers user trap handler 406 (FIG. 5) to default patch 410C (FIG. 7). Third level table 706 is later updated, as described below, to associate the new trap site with newly installed patch 410A (FIG. 7). From step 920 (FIG. 9), processing transfers to step 922 in which instrumentation process 108 (FIG. 1) associates, with the second level index of the new trap site, a reference to the newly created third level table 706 (FIG. 7) within second level table 704. Processing transfer from 922 (FIG. 9) to step 924.

In step 924, instrumentation process 108 (FIG. 1) retrieves from third level table 706 (FIG. 7), which is either retrieved in step 914 (FIG. 9) or created in step 918, a reference to a fourth level table according to the third level index of the new trap site. Step 924 is directly analogous to step 808 (FIG. 8) described above. From step 924 (FIG. 9), processing transfers to test step 926 in which instrumentation process 108 (FIG. 1) determines whether the retrieved reference identifies fourth level table 714 (FIG. 7), thereby indicating that patch database 408 includes no patches corresponding to the third level index of the new trap site. If the retrieved reference does not indentify fourth level table 714, processing transfers to step 934 (FIG. 9) which is described below. Conversely, if the retrieved reference identifies fourth level table 714 (FIG. 7), processing transfers to step 928 (FIG. 9).

In step 928, instrumentation process 108 (FIG. 1) creates a new fourth level table, e.g., fourth level table 708 (FIG. 7). Processing transfers to step 920 (FIG. 9) in which instrumentation process 108 (FIG. 1) associates all fourth level indices of the new fourth level table, e.g., fourth level indices 708A (FIG. 7) of fourth level table 708, with default patch 410C. Since fourth level table 708 is newly created in this example, fourth level table 708 does not correspond to any patches in patch database 408 and therefore associates default patch 410C (FIG. 7) with every fourth level index of table 708. Fourth level table 708 is later updated, as described below, to associate the new trap site with newly installed patch 410A (FIG. 7). From step 920 (FIG. 9), processing transfers to step 932 (FIG. 9) in which instrumentation process 108 (FIG. 1) associates, with the third level index of the new trap site, a pointer to the newly created fourth level table 708 (FIG. 7) within third level table 706. Processing transfer from 932 (FIG. 9) to step 934.

In step 934 (FIG. 9), instrumentation process 108 (FIG. 1) builds a patch record in which the fourth level index of the new trap site is associated with a patch entry point of new patch 410A (FIG. 7). From step 934 (FIG. 9), processing transfers to step 936 in which instrumentation process 108 (FIG. 1) includes the patch record in fourth level table 708 (FIG. 7) such that user trap handler 406 (FIG. 5) is directed to patch 410A (FIG. 7) by reference to fourth level table 708 as described above with respect to step 810 (FIG. 8). After step 936 (FIG. 9), processing according to logic flow diagram 314, and therefore step 314 (FIG. 3), terminates. Thus, according to logic flow diagram 314, the path through patch database 408 (FIG. 7) to patch 410A is established and unused items in each of the tables of patch database 408 direct user trap handler 406 to default patch 410C.

Specific Embodiments

As described above, computer system 100 can be, e.g., any of the SPARCstations workstation computer systems available from Sun Microsystems, Inc. of Mountain View, Calif., any of the Macintosh computer systems based on the PowerPC processor and available from Apple Computers, Inc. of Cupertino, Calif., or any computer system compatible with the IBM PC computer systems available from International Business Machines, Corp. of Somers, N.Y., which are based on the X86 series of processors available from Intel Corporation or compatible processors. Traps to kernel 114 (FIG. 1) of operating system 112 are performed differently on each of these platforms. Therefore, different embodiments of the present invention correspond to each platform on which the present invention is implemented.

X86 Processor

If processor 102 (FIG. 1) of computer system 100 is any of the X86 processors available from Intel Corporation, native computer instructions can vary in size and can be as small as a single byte. Accordingly, one of two different trapping computer instructions replace a native computer instruction of subject process 110 depending on the particular size of the replaced native computer instruction. If the replaced native computer instruction is a single byte in length, a HLT (i.e., halt) computer instruction is the trapping instruction since a HLT computer instruction invokes a trap and is a single byte in length. It is appreciated that other computer instructions which are a single byte in length and which cause a trap to kernel 114 when executed can be used. However, the HLT computer instruction is preferred because the HLT computer instruction affects relatively little of the execution state of subject process 110.

Conversely, if the replaced native computer instruction is longer than a single byte in length, an INT31 (i.e., interrupt number 31) computer instruction is the trapping computer instruction and is two bytes in length. If the replaced native computer instruction is greater than two bytes in length, NULL computer instructions, execution of which causes processor 102 to take no action, are appended to the INT31 computer instruction until the full size of the replaced native computer instruction is filled. NULL computer instructions are a type of no-op computer instruction.

An operating system generally provides a number of interrupt addresses, some of which are used by the operating system and others of which are available to be used by user computer processes, i.e., a computer process initiated by a user and which interacts with the various components of computer system 100 through the operating system. A HLT computer instruction would ordinarily not be used as a trapping instruction because a trap caused by execution of a HLT computer instruction uses an interrupt address which is used by operating system 112 and is typically not available for use by user computer processes such as subject process 110. However, the following pseudo-code fragment illustrates the use of a HLT computer instruction as a trapping computer instruction of a single byte in length and which is processed by kernel trap handler 502 (FIG. 5) in a particularly efficient manner.

```
1:  void handle_trap () {                                              (1)
2:      switch (interrupt_number) {
        ...
3:      case 13:
4:          if (( error_code == PRIVILEGED_INSTRUCTION) &&
5:              (instruction = HLT) &&
6:              (handler_installed(13))) {
7:                  *user_stackp-- = trap_code_segment_pointer;
8:                  *user_stackp-- = trap_instruction_pointer;
9:                  *user_stackp-- = trap_flags_register;
10:                 return_from_interrupt_jumping_to
                    (fast_trap_handler_1);
11:         } else {
12:             execute_general_pro-
                tection_exception_handler();
13:         }
14:         break;
15:     case 31:
16:         if (handler_installed(31)) {
17:                 *user_stackp-- = trap_code_segment_pointer;
18:                 *user_stackp-- = trap_instruction_pointer;
19:                 *user_stackp-- = trap_flags_register;
20:                 return_from_interrupt_jumping_to
                    (fast_trap_handler_2);
21:         } else {
22:             execute_general_protection_excep-
                tion_handler();
23:         }
24:         break;
25:     ...
26:     }
27: }
```

Attempted execution of a HLT computer instruction by subject process 110 (FIG. 1) generates a trap to kernel 114 using interrupt address 13 because the HLT computer instruction is privileged, i.e., only operating system 112 is permitted to execute a HLT computer instruction, and the attempted execution of a privileged computer instruction by subject process 110 causes a trap using interrupt address 13.

Since interrupt address 13 is used when subject process 110 attempts to execute any privileged computer instruction, kernel trap handler 502 (FIG. 5) determines at line 4 of pseudo-code fragment (1) whether the particular error causing use of interrupt address 13 is a privileged instruction error, i.e., is caused by the attempted execution of a privileged computer instruction by subject process 110 (FIG. 1). If the error is other than a privileged instruction error, kernel trap handler 502 executes a conventional general protection exception handler at line 12 of pseudo-code fragment (1). Conversely, if the error is a privileged instruction error, kernel trap handler 502 (FIG. 5) compares trapping computer instruction 402T with a HLT computer instruction at line 5 of pseudo-code fragment (1).

Comparison of trapping computer instruction 402T with a HLT computer instruction is postponed until kernel trap handler 502 determines that the error is a privileged instruction error since kernel trap handler 502 includes information which specifies the particular error causing the trap and can make such a determination without reference to additional information. To compare trapping computer instruction 402T with a HLT computer instruction, kernel trap handler 502 must generally retrieve trapping computer instruction 402T from memory 104 (FIG. 1) and such retrieval can require a considerable amount of time relative to the time required to execute the remainder of pseudo-code fragment (1). Therefore, retrieval of trapping computer instruction 402T (FIG. 5) is postponed until the elimination of the possibility that interrupt address 13 is being used for an error other than a privileged instruction error. However, it is appreciated that kernel trap handler 502 can properly handle traps to kernel 114 without first eliminating the possibility that interrupt address 13 is being used of an error other than a privileged instruction error.

If kernel trap handler 502 determines that the trap occurred as a result of attempted execution of a HLT computer instruction, kernel trap handler 502 determines whether a user-defined trap handler is installed for interrupt address 13. Kernel trap handler 502 makes such a determination by determining whether an entry point is associated with interrupt address 13 within data structure 504.

Once kernel trap handler 502 has determined that the trap occurred as a result of attempted execution of a privileged computer instruction, the privileged computer instruction is a HLT computer instruction, and a user-defined trap handler is installed for interrupt address 13 (at lines 4, 5, and 6, respectively, of pseudo-code fragment (1)), kernel trap handler 502 packages the trap state (step 606 in FIG. 6) at lines 7–8 of pseudo-code fragment (1). Kernel trap handler 502 packages the trap state by pushing on to the stack of subject process 110 the trap code segment pointer and the trap instruction pointer which collectively specify the trap site. Kernel trap handler 502 preserves the state of subject process 110 by (i) refraining from popping data from the stack of subject process 110 and (ii) restoring the contents of the flags register of subject process 110 onto the stack of subject process 110.

The flags register of a computer process, such as subject process 110, is a register which contains flags, each of which defines a component of the execution state of the computer process. For example, such flags indicate whether the most recently performed arithmetic operation by the computer processed produced a positive, negative, or zero result. The flags defining the execution state of subject process 110 at the time of attempted execution of trapping computer instruction 402T is automatically preserved in the flags register of subject process 110. By placing the flags register of subject process 110 onto the stack of subject process 110, kernel trap handler 502 enables restoration of the execution state of subject process 110. Subject process 110 restores its execution state by popping the prior contents of the flags register from the stack of subject process 110 and restoring the flags register of subject process 110 to contain the contents popped from the stack. At line 10, user trap handler 406 is executed, and processing by kernel trap handler 502 terminates.

Alternatively, if interrupt address 31 is used, i.e., if an INT31 computer instruction is trapping computer instruction 402T, kernel trap handler 502 checks that a user trap handler for interrupt address 31 is installed and, if so, (i) packages the trap state, (ii) preserves the state of subject process 110, and (iii) executes user trap handler 406 at lines 16–20 of pseudo-code fragment (1) in the manner described above.

SPARC Processor

If processor 102 (FIG. 1) of computer system 100 is a SPARC processor available from Sun Microsystems, Inc., all computer instructions are equal in size. To instrument a computer process, a native computer instruction is replaced with one of two trapping computer instructions, i.e., a "ta 0x38" computer instruction and a "ta 0x39" computer instruction. As defined by the SPARC processor instruction set, "ta 0x38" and "ta 0x39" computer instructions cause a trap to kernel 114. Kernel trap handler 502, in this embodiment, allows instrumentation process 108 to associate with each of two separate trapping computer instructions one or two alternative instrumentation schemes. Kernel trap handler 502 can therefore instrument subject process 110 in accordance with a selected one of the two alternative instrumentation schemes by selecting as trapping computer instruction 402T either a "ta 0x38" computer instruction or a "ta 0x39" computer instruction. The following pseudo-code fragment illustrates the detection of a user-defined trap in accordance with the present invention when processor 102 is a SPARC processor.

```
1:   void handle_precise_trap() {                                    (2)
2:       switch (trap_number) {
         ...
3:       case 0x38:
4:       case 0x39:
5:           if (handler_installed(trap_number)) {
6:               open_new_register_window();
7:               local_register_1 = trap_program_counter;
8:               local_register_2 = trap_next_program_counter;
9:               integer_condition_codes =
                     trap_integer_condition_codes;
10:              return_from_trap_jump-
                     ing_to(handler(trap_number));
11:          } else {
12:              execute_no_trap_handler_exception_handler();
13:          }
14:          break;
         ...
15:      }
16:  }
```

At lines 3 and 4, kernel trap handler 502 (FIG. 5) determines that the computer instruction causing the trap to the kernel, e.g., trapping computer instruction 402T, is either a "ta 0x38" computer instruction or a "ta 0x39" computer instruction. Therefore, in pseudo-code fragment (2), both trapping computer instructions are processed in an identical manner. If so, kernel trap handler 502 determines whether a trap handler, e.g., user trap handler 406, is installed for the particular trapping computer instruction at line 5 in pseudo-code fragment (2). Kernel trap handler 502 makes such a determination by determining whether an entry point is associated within data structure 504 with the particular trapping computer instruction which caused the current trap to kernel 114. If no such trap handler is installed, kernel trap handler 502 processes the trap in a conventional manner at line 12 of pseudo-code fragment (2). Conversely, if such a trap handler is installed, processing by kernel trap handler 502 proceeds to line 6 of pseudo-code fragment (2).

At line 6 of pseudo-code fragment (2), kernel trap handler 502 opens a new register window to preserve the prior state of registers within processor 102 (FIG. 1). By preserving the state of registers within processor 102 prior to any significant processing by kernel trap handler 502, e.g., prior to processing according to lines 7–10 of pseudo-code fragment (2), any change in the state of the registers effected by kernel trap handler 502 does not affect the processing state of subject process 110. Within the newly opened register window, kernel trap handler 502 (i) stores the program counter in local register one as the trap site, (ii) stores the next program counter in local register two as the computer instruction which executes immediately following execution of the patch executed as a result of the current trap, (iii) stores in the integer condition codes register the integer condition codes at the time of the current trap to preserve the state of the instrumented computer process during execution of the trap to the kernel, and (iv) initiates execution of the user trap handler associated with trapping computer instruction 402T, i.e., user trap handler 406, at lines (i) 7, (ii) 8, (iii) 9, and (iv) 10, respectively, of pseudo-code fragment (2). Thus, when a user trap handler is installed for trapping computer instruction 402T, kernel trap handler 502 quickly and efficiently preserves the state of subject computer process 110, packages the trap state including the trap site, and transfers processing to user trap handler 406.

PowerPC Processor

If processor 102 (FIG. 1) of computer system 100 is a PowerPC processor available from Motorola, Inc., all computer instructions are equal in size. To instrument a computer process, a native computer instruction is replaced with one of two trapping computer instructions, i.e., a "twi 1f,0,1" computer instruction and a "twi 1f,0,2" computer instruction. As defined by the PowerPC processor instruction set, "twi 1f,0,1" and "twi 1f,0,2" computer instructions cause a trap to kernel 114. Kernel trap handler 502, in this embodiment, allows instrumentation process 108 to associate with each of two separate trapping computer instructions one or two alternative instrumentation schemes. Kernel trap handler 502 can therefore instrument subject process 110 in accordance with a selected one of the two alternative instrumentation schemes by selecting as trapping computer instruction 402T either a "twi 1f,0,1" computer instruction or a "twi 1f,0,2" computer instruction. The following pseudo-code fragment illustrates the detection of a user-defined trap in accordance with the present invention when processor 102 is a PowerPC processor.

```
1:  void handle_program_trap() {
2:      switch (trap_instruction) {
        . . .
3:          case "twi 1f,0,1":
4:          case "twi 1f,0,2":
5:              if (handler_installed(trap_instruction) {
```

-continued

```
6:              *(user_stackp-16) = user_stackp;
7:              *(user_stackp-12)=NULL_WORD);
8:              *(user_stackp-8)=status_save_register_0;
9:              *(user_stackp-4)=NULL_WORD;
10:             user_stackp-=16;
11:             condition_register=trap_condition_register;
12:             return_from_trap_to(handler(trap_instruction));
13:         } else {
14:             execute_no_trap_handler_exception_handler();
15:         }
16:         break;
            . . .
17:     }
18: }
```

At lines 3 and 4, kernel trap handler 502 (FIG. 5) determines that the computer instruction causing the trap to the kernel, e.g., trapping computer instruction 402T, is either a "twi 1f,0,1" computer instruction or a "twi 1f,0,2" computer instruction. If so, kernel trap handler 502 determines whether a trap handler, e.g., user trap handler 406, is installed for the particular trapping computer instruction at line 5 in pseudo-code fragment (2). Kernel trap handler 502 makes such a determination by determining whether an entry point is associated within data structure 504 with with the particular trapping computer instruction which caused the current trap to kernel 114. If no such trap handler is installed, kernel trap handler 502 processes the trap in a conventional manner at line 14 of pseudo-code fragment (2). Conversely, if such a trap handler is installed, processing by kernel trap handler 502 proceeds to line 6 of pseudo-code fragment (2).

At lines 6–10 of pseudo-code fragment (3), kernel trap handler 502 pushes onto the stack of subject computer process 110 (i) the prior stack pointer of the stack of subject computer process 110 and (ii) status save register zero. Status save register zero contains data specifying the address within address space 110AS of subject process 110 of the computer instruction causing the trap to kernel 114, e.g., trapping computer instruction 402T. Kernel trap handler 502 then restores the state of subject computer process 110 to its state at the time of execution of trapping computer instruction 402T by storing in a condition register, which is a part of the state of subject computer process 110, data which is moved from the condition register to a trap condition register as a result of the trap to the kernel. Kernel trap handler 502 then initiates execution of the user trap handler associated with trapping computer instruction 402T, i.e., user trap handler 406. Thus, when a user trap handler is installed for trapping computer instruction 402T, kernel trap handler 502 quickly and efficiently preserves the state of subject computer process 110, packages the trap state including the trap site, and transfers processing to user trap handler 406.

The above description is illustrative only and is not limiting. The present invention is therefore defined fully by the appended claims together with their full scope of equivalents.

What is claimed is:

1. In a computer system having an operating system, a method for providing a trap to the operating system during execution of a collection of one or more native computer instructions, the method comprising:

replacing a selected one of the one or more native computer instructions with a trapping computer instruction which when executed, causes the trap to the operating system;

providing a patch of one or more additional computer instructions; and configuring a trap handler such that the trap to the operating system caused by execution of the trapping computer instruction in turn causes execution of the patch of one or more additional computer instructions, wherein the patch of one or more additional computer instructions aids in evaluating the collection of one or more native computer instructions during execution of the collection of one or more native computer instructions.

2. The method of claim 1 wherein the patch of one or more additional computer instructions includes the selected native computer instruction.

3. The method of claim 1 wherein the size of the selected native computer instruction is equal to the size of the trapping computer instruction.

4. In a computer system having an operating system, an apparatus for transferring control of a computer process from a first location within the computer process to a destination computer instruction at a second location within the computer process, the apparatus comprising:

a module configured to include at the first location a selected privileged computer instruction;

a trap handler which transfers control of the computer process to the destination computer instruction in response to a trap to the operating system which is caused by execution of the selected privileged computer instruction;

a first module configured to determine whether the trap is caused by attempted execution of a privileged computer instruction; and a second module configured to determine whether the trap is caused by attempted execution of the selected privileged computer instruction;

wherein the second module is executed if the trap handler determines that the trap is caused by attempted execution of a privileged computer instruction.

5. A computer system comprising:

a processor;

a memory operatively coupled to the processor;

an operating system operatively coupled to the processor and to the memory and which can execute a computer process in the processor from the memory;

a mapping module which is operatively coupled to the operating system and which is configured to map a trap site to a patch of one or more computer instructions associated with the computer process, the mapping module comprising:
  (a) a patch database which is stored in the memory and which comprises:
    (i) an association of a set of patches of one or more computer instructions with a set of respective trap sites; and
    (ii) an association of a default patch of one or more computer instructions with every possible trap site of the computer process other than the set of trap sites, wherein the default patch is associated with unanticipated traps.

6. In a computer system having an operating system, a method for handling a trap to the operating system during execution of a computer process, the method comprising:

including within the computer process a selected privileged computer instruction;

providing in the computer process a second computer instruction to which control is to be transferred;

including in a trap handler of the operating system one or more computer instructions which, when executed, transfer control of the computer process to the second computer instruction if the trap to the operating system is caused by execution of the selected privileged computer instruction, wherein the trap handler determines whether the trap to the operating system is caused by execution of the selected privileged computer instruction by performance of the following steps:

determining whether the trap is caused by attempted execution of a privileged
computer instruction; and determining whether the trap is caused by attempted execution of the selected privileged computer instruction if the trap handler determines that the trap is caused by attempted execution of a privileged computer instruction.

7. A computer system comprising:

a processor;

a memory operatively coupled to the processor;

an operating system operatively coupled to the processor and to the memory and which can execute a collection of computer instructions in the processor from the memory;

an instruction replacing module which is operatively coupled to the operating system and which is configured to provide a trap to the operating system during execution of the collection of computer instructions, the instruction replacing module comprising:
  (a) a selecting module which is configured to select a native computer instruction at a first location within the collection of computer instructions;
  (b) an including module which is operatively coupled to the selecting module and which is configured to include a patch of one or more additional computer instructions at a second location within the collection of computer instructions;
  (c) a determining module which is operatively coupled to the selecting module and to the including module and which is configured to determine the difference between the first and second locations;
  (d) a first replacing module which is operatively coupled to the determining module and which is configured to replace the selected native computer instruction of the collection of computer instructions with a branching computer instruction if the difference between the first and second locations is not greater than a predetermined threshold wherein the branching computer instruction, when executed, causes transfer of control during execution of the collection of computer instructions to the patch of one or more computer instructions; and
  (e) a second replacing module which is operatively coupled to the determining module and which is configured to replace the selected native computer instruction of the collection of computer instructions with a trapping computer instruction if the difference between the first and second locations is greater than the predetermined threshold wherein the trapping computer instruction, when executed, causes a trap to the operating system; and a trap handler which is operatively coupled to the operating system and which causes execution of the patch of one or more additional computer instructions in response to a trap to the operating system caused by execution of the trapping compute instruction.

8. The computer system of claim 7 wherein the patch of one or more additional computer instructions includes the replaced native computer instruction.

9. The computer system of claim 7 wherein the size of the selected native computer instruction is equal to the size of the trapping computer instruction if the difference between the first and second locations is greater than the predetermined threshold; and further wherein the size of the selected native computer instruction is equal to the size of the branching computer instruction if the difference between the first and second locations is not greater than the predetermined threshold.

10. A computer system comprising:

a processor;

a memory operatively coupled to the processor;

an operating system operatively coupled to the processor and to the memory and which can execute a computer process in the processor from the memory;

a mapping module which is operatively coupled to the operating system and which is configured to map a trap site to a patch of one or more computer instructions of the computer process, the mapping module comprising:

(a) a patch database which is stored in the memory and which comprises:

(i) an association of a set of patches of one or more computer instructions with a set of respective trap sites; and (ii) an association of a default patch of one or more computer instructions with every possible trap site of the computer process other than the set of trap sites;

wherein the patch database comprises:

a first portion; and one or more secondary portions;

wherein association (i) comprises:

an association within the first portion of most significant bit portions of the set of trap sites with respective ones of the secondary portions; and an association, within the secondary portions, of least significant bit portions of the set of trap sites with the set of patches of one or more computer instructions.

11. The computer system of claim 10 wherein association (ii) comprises:

an association within the first portion of a default one of the secondary portions with every most significant bit portion other than the significant bit portions of the set of trap sites; and an association within the default secondary portion of the default patch with least significant bit portions of all possible trap sites of the computer process.

12. The computer system of claim 11 wherein association (ii) further comprises:

an association within each secondary portion of the default patch with least significant bit portions of every possible trap site, which has a most significant bit portion associated with the secondary portion of the patch database and which is different from each of the set of trap sites.

13. In a computer system having a memory, a method for mapping a trap site to a patch of one or more computer instructions of a computer process, the method comprising:

(a) storing a patch database in the memory;

(b) associating within the patch database, a set of patches of one or more computer instructions with a set of respective trap sites; and (c) associating within the patch database, a default patch of one or more computer instructions with every possible trap site of the computer process other than the set of trap sites, wherein step (b) comprises:

associating within a first portion of the patch database, most significant bit portions of the set of trap sites with respective secondary portions of the patch database; and associating within a set of the secondary portions of the patch database, least significant bit portions of the set of trap sites with respective ones of the set of patches of one or more computer instructions.

14. The method of claim 13 wherein step (c) comprises:

associating within the first portion of the patch database, a default secondary portion of the patch database with every most significant bit portion other than the most significant bit portions of the set of trap sites; and associating within the default secondary portion of the patch database, the default patch with least significant bit portions of all possible trap sites of the computer process.

15. The method of claim 14 wherein step (c) further comprises:

associating within each secondary portion of the patch database, the default patch with least significant bit portions of every possible trap site, which has a most significant bit portion associated with the secondary portion of the patch database and which is different from each of the set of trap sites.

16. In a computer system having an operating system, a method for enabling a trap to the operating system, the trap being created during execution of a collection of one or more native computer instructions, the method comprising:

(a) selecting a selected one of the collection of one or more native computer instructions at a first location within the collection;

(b) providing a patch of one or more additional computer instructions at a second location within the collection;

(c) performing the following step if the difference between the first and second locations is greater than a predetermined threshold:

(i) replacing the selected one of the collection of one or more native computer instructions with a trapping computer instruction which, when executed, causes the trap to the operating system which executes the native computer instructions of the collection and which is configured such that the trap to the operating system caused by execution of the trapping computer instruction in turn causes execution of the patch of one or more additional computer instructions; and (d) performing the following step if the difference between the first and second locations is not greater than the predetermined threshold:

(i) replacing the selected native computer instruction with a branching computer instruction which, when executed, causes transfer of control of the native computer instructions of the collection to the patch of one or more additional computer instructions.

17. The method of claim 16 wherein the patch of one or more additional computer instructions includes the selected one of the collection of one or more native computer instructions.

18. The method of claim 16 wherein the size of the selected one of the collection of one or more native computer instructions is equal to the size of the trapping computer instruction if the difference between the first and second locations is greater than the predetermined threshold; and further wherein the size of the selected one of the collection of one or more native computer instructions is equal to the size of the branching computer instruction if the difference between the first and second locations is not greater than the predetermined threshold.

19. A computer program product comprising:

a computer usable medium having computer readable code embodied therein for providing a trap to an operating system during execution of a collection of one or more native computer instructions, the computer readable code comprising:

a computer instruction replacement module which is configured to replace a selected one of the native computer instructions with a trapping computer instruction which, when executed, causes the trap to the operating system;

a patch of one or more computer instructions; and a trap handler which is operatively coupled to the patch and which, in response to the trap to the operating system, causes execution of the patch of one or more computer instructions, wherein the patch of one or more computer instructions aids in evaluating the collection of one or more native computer instructions during execution of the collection of one or more native computer instructions.

20. The computer program product of claim 19 wherein the patch of one or more computer instructions includes the selected native computer instruction.

21. The computer program product of claim 19 wherein the size of the selected native computer instruction is equal to the size of the trapping computer instruction.

22. A computer program product comprising:

a computer usable medium having computer readable code embodied therein for handling a trap to an operating system during execution of a computer process, the computer readable code comprising:

(a) a computer instruction replacement module which is configured to replace a selected native computer instruction in the computer process with a selected privileged computer instruction, the computer process including:

(i) the selected privileged computer instruction at a source location within the computer process; and (ii) a second computer instruction at a destination location within the computer process; and (b) a trap handler which is operatively coupled to the operating system and which comprises:

(i) one or more computer instructions which, when executed, transfer control of the computer process to the second computer instruction if a trap to the operating system is caused by execution of the selected privileged computer instruction.

23. The computer program product of claim 22 wherein the selected privileged computer instruction is one byte in length.

24. A computer program product comprising:

a computer usable medium having computer readable code embodied therein for handling a trap to an operating system during execution of a computer process, the computer readable code comprising:

(a) a computer instruction replacement module which is configured to replace a selected native computer instruction in the computer process with a selected privileged computer instruction, the computer process including:

(i) the selected privileged computer instruction at a source location within the computer process: and (ii) a second computer instruction at a destination location within the computer process; and (b) a trap handler which is operatively coupled to the operating system and which comprises:

(i) one or more computer instructions which, when executed, transfer control of the computer process to the second computer instruction if a trap to the operating system is caused by execution of the selected privileged computer instruction, wherein the one or more computer instructions of the trap handler further comprise:

one or more computer instructions which, when executed by the computer processor, determine whether the trap is caused by attempted execution of a privileged computer instruction; and one or more computer instructions which, when executed by the computer processor, determine whether the trap is caused by attempted execution of the selected privileged computer instruction if the trap is caused by attempted execution of a privileged computer instruction.

25. The computer program product of claim 22 wherein the selected privileged computer instruction is a halt computer instruction.

26. A computer program product comprising:

a computer usable medium having computer readable code embodied therein for implementing programmable traps to an operating system in a computer process in which attempted execution of a trapping computer instruction of the computer process transfers control of the computer process to a trap handler within the computer process and in which transfer of control to the operating system in response to a trap to the operating system affects a set of affected components of the state of the computer process, the computer usable medium comprising:

a trap handler which performs substantially no more than the following steps in response to a trap to the operating system by the computer process:

retrieving state data which represents respective states of the set of affected components;

storing the state data in a memory location which is accessible by the computer process; and transferring control of the computer process to the operating system.

27. The computer program product of claim 26 wherein the trap handler performs the following additional steps in response to a trap to the operating system by the computer process:

retrieving trap site data which represents the address of the trapping computer instruction; and storing the trap site data in a second memory location which is accessible by the computer process.

28. The computer program product of claim 26 wherein the trap handler performs the following additional steps in response to a trap to the operating system by the computer process:

avoiding any changes to the state of the computer process other than the set of affected components.

29. A computer system comprising:

a processor;

a memory operatively coupled to the processor;

an operating system which is operatively coupled to the processor and to the memory and which can execute a collection of computer instructions in the processor from the memory;

a module configured to enable a trap to the operating system, the trap being created during execution of the collection of computer instructions, the module comprising:

a replacing module configured to replace a native computer instruction of the collection of computer instructions with a trapping computer instruction which, when executed in the processor, causes the trap to the operating system;

a patch module which is operatively coupled to the replacing module and which is configured to include in the collection of computer instructions a patch of one or more additional computer instructions; and a trap handler which is operatively coupled to the collection of computer instructions and the operating system and which causes execution of the patch of one or more computer additional instructions in response to a trap to the operating system caused by execution of the trapping computer instruction.

30. A computer-readable medium storing thereon computer-readable instructions for mapping a trap site to a patch of one or more computer instructions associated with a computer process, the computer-readable medium comprising:

a patch database in which a set of trap sites are mapped to corresponding patches, each of which includes one or more computer instructions, the database comprising:

(a) an association of a set of patches of one or more computer instructions with a set of respective trap sites; and (b) an association of a default patch of one or more computer instructions with every possible trap site other than the set of trap sites, wherein the default patch is associated with unanticipated traps; and a control transferring module adapted for transferring control to one of the set of patches of one or more computer instructions in response to one of the set of respective trap sites, and otherwise transferring control to the default patch.

31. The compute-readable medium of claim 30 wherein association (a) comprises:

(i) an association, within a first portion of the patch database, of most significant bit portions of the set of trap sites with respective secondary portions of the patch database; and (ii) an association, within each secondary portion of the patch database, of least significant bit portions of the set of trap sites with respective ones of the set of patches of one or more computer instructions.

32. The computer-readable medium of claim 31 wherein association (b) comprises:

(i) an association, within the first portion of the patch database, of a default secondary portion of the patch database with every most significant bit portion other than the significant bit portions of the set of trap sites; and (ii) an association, within the default secondary portion of the patch database, of the default patch with least significant bit portions of all possible trap sites of the computer process.

33. The computer-readable medium of claim 32 wherein association (b) further comprises:

(iii) an association, within each secondary portion of the patch database, of the default patch with least significant bit portions of every possible trap site, which has a most significant bit portion associated with the secondary portion of the patch database and which is different from each of the set of trap sites.

34. A computer program product comprising:

a computer usable medium having computer readable code embodied therein for enabling a trap, the trap being created during execution of a collection of native computer instructions, the computer usable medium comprising:

(a) a selection module which selects a native computer instruction at a first location within the collection;

(b) a patch module which is operatively coupled to the selection module and which provides a patch of one or more computer instructions at a second location within the collection;

(c) a distance module which is operatively coupled to the selection module and the patch module and which determines the difference between the first and second locations;

(d) a first replacement module which is operatively coupled to the selection and patch modules and which:

(i) replaces the selected native computer instruction with a trapping computer instruction which, when executed, causes a trap to an operating system within which the computer instructions of the collection execute; and (ii) configures a trap handler such that a trap to the operating system caused by execution of the trapping computer instruction in turn causes execution of the patch of one or more computer instructions;

(e) a second replacement module which is operatively coupled to the selection and patch modules and which replaces the selected native computer instruction with a branching computer instruction which, when executed, causes transfer of control of execution of the computer instructions of the collection to the patch of one or more computer instructions; and (f) a mode selection module which is operatively coupled to the first and second replacement modules and the distance module and which causes the first replacement module to be executed if the difference between the first and second locations is greater than a predetermined threshold and which causes the second replacement module to be executed if the difference between the first and second locations is not greater than the predetermined threshold.

35. The computer program product of claim 34 wherein the patch of one or more computer instructions includes the selected native computer instruction.

36. The computer program product of claim 34 wherein the size of the selected native computer instruction is equal to the size of the trapping computer instruction if the difference between the first and second locations is greater than the predetermined threshold; and further wherein the size of the selected native computer instruction is equal to the size of the branching computer instruction if the difference between the first and second locations is not greater than the predetermined threshold.

37. An apparatus for providing a trap to an operating system during execution of a collection of one or more native computer instructions, the apparatus comprising:

a module configured to replace a selected native computer instruction of the computer process with a trapping computer instruction which, when executed, causes a trap to the operating system;

a patch of one or more computer instructions; and a trap handler, operatively coupled to the operating system, which causes execution of the patch of one or more computer instructions in response to a trap to the operating system caused by execution of the trapping computer instruction, wherein the patch of one or more computer instructions aids in evaluating the collection of one or more native computer instructions during execution of the collection of one or more native computer instructions.

38. The apparatus of claim 37 wherein the patch of one or more computer instructions includes the selected native computer instruction.

39. The apparatus of claim 37 wherein the size of the selected native computer instruction is equal to the size of the trapping computer instruction.

40. A computer system comprising:

a processor;

a memory operatively coupled to the processor;

an operating system (i) which is operatively coupled to the processor and to the memory, (ii) which can execute a computer process in the processor from the memory, (iii) in which attempted execution of a trapping computer instruction of the computer process transfers control of the computer process to a trap handler within the computer process, and (iv) in which transfer of control to the operating system in response to a trap to the operating system affects a set of components of the state of the computer process, the operating system comprising:

a state retrieving module which is configured to retrieve state data which represents respective states of the set of affected components;

a state transfer module which is configured to store the state data in a memory location which is accessible by the computer process; and a control transfer module which is configured to transfer control to the operating system;

wherein substantially only the state retrieving module, the state transfer module, and the control transfer module execute in response to a trap to the operating system.

41. The computer system of claim 40 wherein the operating system further comprises:

a trap site retrieving module which is configured to retrieve trap site data which represents the address of the trapping computer instruction; and a trap site transfer module which is operatively coupled to the trap site retrieving module and which is configured to store the trap site data in a second memory location which is accessible by the computer process;

wherein substantially only the state retrieving module, the state transfer module, the control transfer module, the trap site retrieving module, and the trap site transfer module execute in response to a trap to the operating system.

42. The apparatus of claim 40 wherein the state retrieving module, the state transfer module, and the control transfer module produce, when executed, substantially no changes to the state of the computer process other than the set of affected components.

43. A computer system comprising:

a processor;

a memory operatively coupled to the processor;

an operating system which is operatively coupled to the processor and the memory and which can execute a computer process in the processor from the memory;

a module configured to include at a first address in the computer process a selected privileged computer instruction;

a module configured to transfer control of the computer process, which includes at the first address the selected privileged computer instruction and at a second address a destination computer instruction, the module comprising:

a trap handler which transfers control of processing of the computer process to the destination computer instruction in response to a trap to the operating system which is caused by execution of the selected privileged computer instruction;

wherein the operating system comprises:

a first module configured to determine whether the trap is caused by attempted execution of a privileged computer instruction; and a second module which is operatively coupled to the first module and which is configured to determine whether the trap is caused by attempted execution of the selected privileged computer instruction;

wherein the second module executes in response to a determination by the first module that the trap is caused by attempted execution of a privileged computer instruction.

44. In a computer system having an operating system, an apparatus for implementing programmable traps to the operating system, the programmable traps being implemented in a computer process in which attempted execution of a trapping computer instruction of the computer process transfers control of the computer process to a trap handler and in which transfer of control to the operating system in response to a trap to the operating system affects a set of components of the state of the computer process, the apparatus comprising:

a state retrieving module which is configured to retrieve state data which represents respective states of the set of affected components;

a state transfer module which is configured to store the state data in a memory location which is accessible by the computer process; and a control transfer module which is configured to transfer control to the operating system;

wherein substantially only the state retrieving module, the state transfer module, and the control transfer module execute in response to a trap to the operating system.

45. The apparatus of claim 44 further comprising:

a trap site retrieving module which is configured to retrieve trap site data which represents the address of the trapping computer instruction; and a trap site transfer module which is operatively coupled to the trap site retrieving module and which is configured to store the trap site data in a second memory location which is accessible by the computer process;

wherein substantially only the state retrieving module, the state transfer module, the control transfer module, the trap site retrieving module, and the trap site transfer module execute in response to a trap to the operating system.

46. The apparatus of claim 44 wherein the state retrieving module, the state transfer module, and the control transfer module produce, when executed, no changes to the state of the computer process other than the set of affected components.

47. The computer system of claim 29 wherein the size of the replaced native computer instruction is equal to the size of the trapping computer instruction.

48. A computer system for mapping a trap site to a patch of one or more computer instructions associated with a computer process, comprising:
- a processor; and
- a memory, the memory having stored therein:
  - a patch database including:
    - (i) an association of a set of patches of one or more computer instructions with a set of trap sites; and
    - (ii) an association of a default patch of one or more computer instructions with every possible trap site of the computer process other than the set of trap sites, wherein the default patch is associated with unanticipated traps, the computer system being adapted for transferring control to one of the set of patches of one or more computer instructions in response to one of the set of trap sites, and otherwise transferring control to the default patch.

49. The computer system of claim 29 wherein the patch of one or more additional computer instructions includes the replaced native computer instruction.

50. The apparatus of claim 49 wherein association (ii) comprises:
- an association within the first portion of a default one of the secondary portions with every most significant bit portion other than the most significant bit portions of the set of trap sites; and
- an association within the default secondary portion of the default patch with least significant bit portions of all possible trap sites of the computer process.

51. The apparatus of claim 50 wherein association (ii) further comprises:
- an association within each secondary portion of the default patch with least significant bit portions of every possible trap site, which has a most significant bit portion associated with the secondary portion of the patch database and which is different from each of the set of trap sites.

52. In a computer system having an operating system, an apparatus for providing a trap to the operating system during execution of a collection of native computer instructions, the operating system capable of executing the collection of native computer instructions, the apparatus comprising:
- a selection module configured to select a native computer instruction at a first location within an address space of the collection;
- a patch of one or more computer instructions at a second location within the address space of the collection;
- a first module which is operatively coupled to the selection module and the patch and which is configured to determine the difference between the first and second locations;
- a second module which is operatively coupled to the first module and which is configured to replace the selected native computer instruction of the collection with a branching computer instruction if the difference between the first and second locations is not greater than a predetermined threshold wherein the branching computer instruction, when executed, causes transfer of processing of the computer process to the patch of one or more computer instructions;
- a third module which is operatively coupled to the first module and which is configured to replace the selected native computer instruction of the computer process with a trapping computer instruction if the difference between the first and second locations is greater than the predetermined threshold wherein the trapping computer instruction, when executed, causes a trap to the operating system; and
- a trap handler, which is operatively coupled to the operating system and to the patch of one or more computer instructions and which is configured to cause execution of the patch of one or more computer instructions in response to a trap to the operating system which is caused by attempted execution of the trapping computer instruction.

53. The apparatus of claim 52 wherein the patch of one or more computer instructions includes the selected native computer instruction.

54. The apparatus of claim 52 wherein the size of the selected native computer instruction is equal to the size of the trapping computer instruction if the difference between the first and second locations is greater than the predetermined threshold; and
further wherein the size of the selected native computer instruction is equal to the size of the branching computer instruction if the difference between the first and second locations is not greater than the predetermined threshold.

* * * * *

UNITED STATES PATENT AND TRADEMARK OFFICE
CERTIFICATE OF CORRECTION

PATENT NO. : 6,253,317 B1
DATED : June 26, 2001
INVENTOR(S) : Knapp, III et al.

It is certified that error appears in the above-identified patent and that said Letters Patent is hereby corrected as shown below:

Add allowed claim 55:
--55. The apparatus of Claim 48 wherein the patch database further comprises:
a first portion; and
one or more secondary potions;
further wherein association (i) comprises:
an association within the first portion fo most significant bit portions of the set of trap sites with respective ones of the secondary portions; and
an association within the secondary portions of least significant bit portions of the set of trap sites with respective ones of the set of patches of one or more computer instructions.--

Signed and Sealed this

Fourth Day of December, 2001

*Attest:*

*Attesting Officer*

NICHOLAS P. GODICI
*Acting Director of the United States Patent and Trademark Office*